(12) United States Patent
Duan et al.

(10) Patent No.: US 11,775,597 B2
(45) Date of Patent: *Oct. 3, 2023

(54) VEHICLE INVENTORY SEARCH RECOMMENDATION USING IMAGE ANALYSIS DRIVEN BY MACHINE LEARNING

(71) Applicant: Capital One Services, LLC, McLean, VA (US)

(72) Inventors: Yue Duan, Plano, TX (US); Sunil Vasisht, Frisco, TX (US); Chi-san Ho, Allen, TX (US); Micah Price, Anna, TX (US)

(73) Assignee: Capital One Services, LLC, McLean, VA (US)

( * ) Notice: Subject to any disclaimer, the term of this patent is extended or adjusted under 35 U.S.C. 154(b) by 155 days.

This patent is subject to a terminal disclaimer.

(21) Appl. No.: 17/305,399

(22) Filed: Jul. 7, 2021

(65) Prior Publication Data

US 2021/0334319 A1 Oct. 28, 2021

Related U.S. Application Data

(63) Continuation of application No. 16/685,385, filed on Nov. 15, 2019, now Pat. No. 11,068,549.

(51) Int. Cl.
*G06F 16/00* (2019.01)
*G06F 16/953* (2019.01)
(Continued)

(52) U.S. Cl.
CPC .......... *G06F 16/953* (2019.01); *G06F 16/56* (2019.01); *G06F 16/5838* (2019.01); *G06F 16/5854* (2019.01); *G06N 3/08* (2013.01)

(58) Field of Classification Search
CPC .... G06F 16/953; G06F 16/56; G06F 16/5838; G06F 16/5854; G06F 16/583; G06N 3/08; G06N 3/045; G06N 3/084
See application file for complete search history.

(56) References Cited

U.S. PATENT DOCUMENTS 8,537,409 B2 * 9/2013 Marchesotti ......... G06V 10/464
382/218
8,732,030 B2 5/2014 Gokturk et al.
(Continued)

FOREIGN PATENT DOCUMENTS

CN 103150904 A 6/2013
WO 2010141637 A1 12/2010

*Primary Examiner* — Jared M Bibbee
(74) *Attorney, Agent, or Firm* — Harrity & Harrity, LLP

(57) ABSTRACT

A device receives user interface interaction data that identifies an interaction that a user has with an interface that displays an image of a vehicle. The device generates, by using a data model to process at least a portion of the image, an array of vectors that includes one or more vectors relating to vehicle characteristics of the vehicle. The device assigns one or more weights to the one or more vectors based on the user interface action data. The device determines, based on a similarity analysis, similarity scores that indicate similarities between the array of vectors that include the one or more vectors that have been weighted and other arrays relating to the vehicles depicted in the images. The device selects a subset of the images based on the similarity scores and causes the subset of the images to be displayed.

20 Claims, 10 Drawing Sheets

(51) Int. Cl.
  *G06N 3/08*   (2023.01)
  *G06F 16/583*  (2019.01)
  *G06F 16/56*   (2019.01)

(56) References Cited

U.S. PATENT DOCUMENTS

| | | | |
|---|---|---|---|
| 11,068,549 B2 | 7/2021 | Duan et al. | |
| 2008/0177640 A1* | 7/2008 | Gokturk | G06Q 30/02 |
| | | | 705/26.62 |
| 2010/0135582 A1* | 6/2010 | Gokturk | G06Q 30/0603 |
| | | | 382/195 |
| 2016/0321519 A1* | 11/2016 | Chan | G06V 20/52 |
| 2017/0255840 A1* | 9/2017 | Jean | G06V 10/462 |
| 2018/0260793 A1* | 9/2018 | Li | G06N 5/01 |
| 2019/0156395 A1* | 5/2019 | Bessega | G06Q 30/02 |

* cited by examiner

| Example Similarity Analysis |
|---|
| • Compare vector array output by data model to set of arrays of vectors |

140
Configured to perform similarity analysis that may be used to select one or more images of vehicles to recommend to users

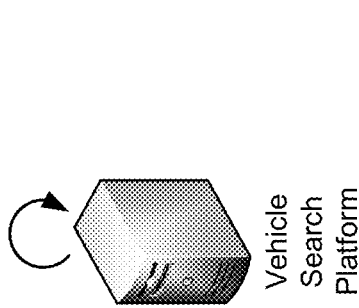
Vehicle Search Platform

| Example Filtering Techniques |
|---|
| • Vehicle Orientation Filtering Technique
• Layered Vehicle Characteristic Filtering Technique |

135
Configure with set of filtering techniques that may be used to filter set of arrays of vectors

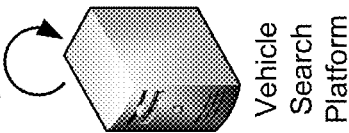
Vehicle Search Platform

| Example Data Structure |
|---|
| • Vector_Array_1::Image_Identifier_1
• Vector_Array_2::Image_Identifier_2
• •
• •
• Vector_Array_N::Image_Identifier_N |

130
Store set of arrays of vectors in association with identifiers associated with collection of vehicles

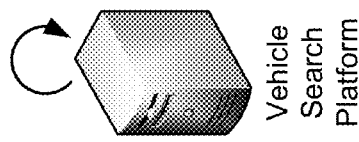
Vehicle Search Platform

FIG. 1B

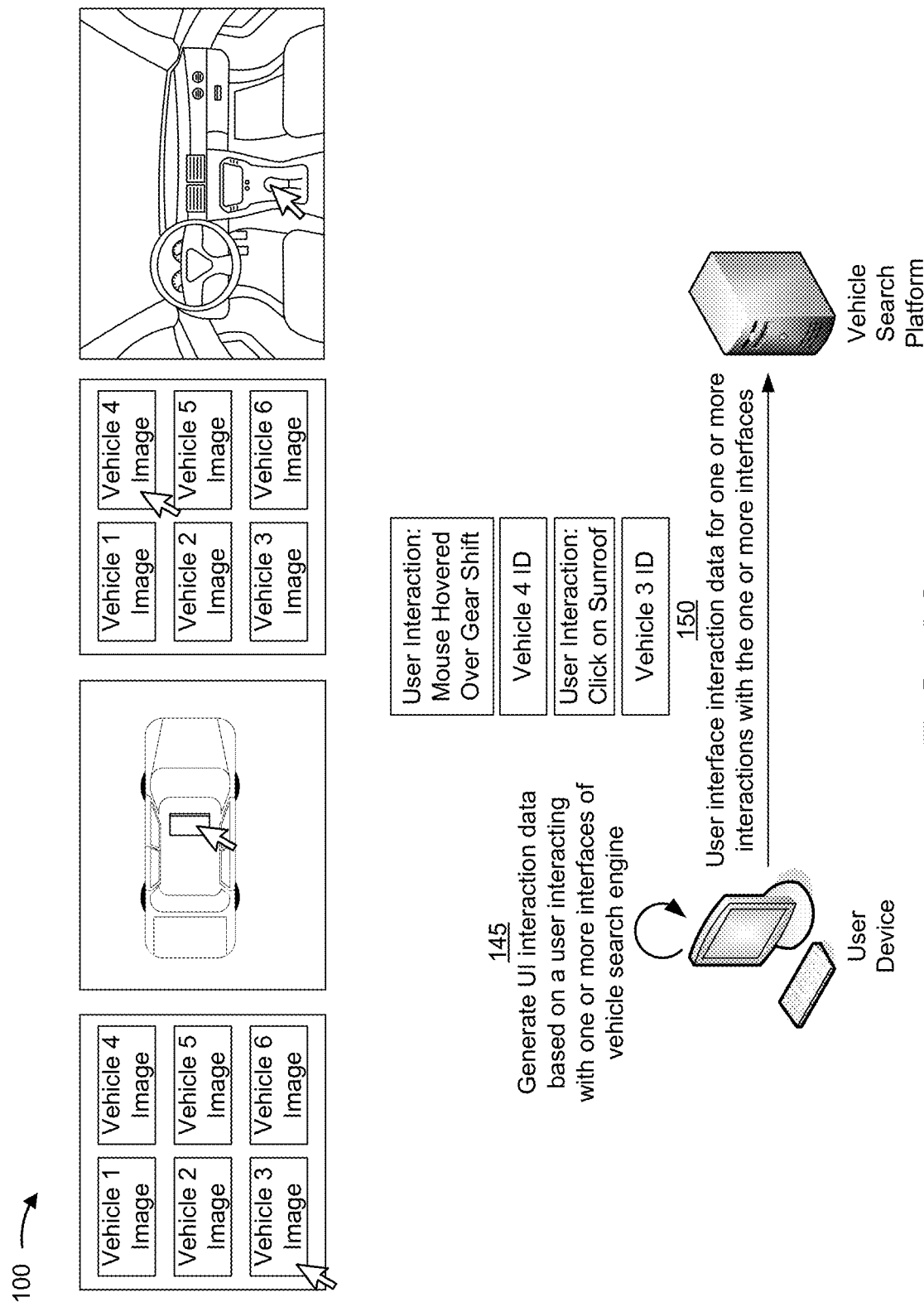

VEHICLE INVENTORY SEARCH RECOMMENDATION USING IMAGE ANALYSIS DRIVEN BY MACHINE LEARNING

RELATED APPLICATION

This application is a continuation of U.S. patent application Ser. No. 16/685,385, filed Nov. 15, 2019 (now U.S. Pat. No. 11,068,549), which is incorporated herein by reference in its entirety.

BACKGROUND

A search engine may be used to perform a web search. For example, a user may provide search terms into a search query which may cause the search engine to return search results based on the search query. In some cases, a search engine may include an image search engine that allows a user to provide search terms (e.g., text, an image, image metadata, and/or the like) into a search query which may cause the image search engine to return one or more images based on the search query.

SUMMARY

According to some implementations, a method may include receiving user interface interaction data that identifies one or more interactions that a user has with one or more interfaces of a vehicle search engine that display images of a set of vehicles, wherein an interaction, of the one or more interactions, is with a specific part of an image of a vehicle. The method may include identifying, by using an object detection model to process the image of the vehicle, a set of vehicle characteristics of the vehicle. The method may include generating, by using a data model that has been trained using machine learning to process image data that depicts at least a portion of the vehicle, an array of vectors that includes one or more vectors that represent the set of vehicle characteristics of the vehicle. The method may include assigning one or more weights to the one or more vectors based on the user interface interaction data. The method may include determining a set of similarity scores that indicate similarities between the array of vectors that include the one or more vectors that have been weighted and other arrays of vectors relating to the set of vehicles, wherein the set of similarity scores are determined based on a similarity analysis of the array of vectors that include the one or more vectors that have been weighted and the other arrays of vectors. The method may include selecting a subset of the images of the set of vehicles based on the set of similarity scores. The method may include causing the subset of the images to be displayed via at least one of the one or more interfaces of the vehicle search engine.

According to some implementations, a device may include one or more memories, and one or more processors, operatively coupled to the one or more memories, configured to: receive, over a given time period, user interface interaction data that identifies a sequence of interactions that a user has with one or more interfaces of a vehicle search engine that display images of a set of vehicles, wherein an interaction, of the sequence of interactions, is with an image of a vehicle. The one or more processors may generate an array of vectors by using a data model that has been trained using machine learning to process image data that depicts at least a portion of the image of the vehicle, wherein the array of vectors includes one or more vectors that represent a set of vehicle characteristics of the vehicle. The one or more processors may assign one or more weights to the one or more vectors based on the user interface interaction data. The one or more processors may determine a set of similarity scores that indicate similarities between the one or more vectors that have been weighted and one or more other vectors that are part of other arrays of vectors relating to the set of vehicles, wherein the set of similarity scores are determined based on a similarity analysis of the one or more vectors that have been weighted and the one or more other vectors. The one or more processors may select a subset of the images of the set of vehicles based on the set of similarity scores. The one or more processors may cause the subset of the images to be displayed via at least one of the one or more interfaces of the vehicle search engine.

According to some implementations, a non-transitory computer-readable medium may store one or more instructions that, when executed by one or more processors of a device, may cause the one or more processors to: receive user interface interaction data that identifies one or more interactions that a user has with one or more interfaces of a vehicle search engine that display images of a set of vehicles, wherein an interaction, of the one or more interactions, is with a part of an image that depicts a component of a vehicle or a sub-component of the component of the vehicle. The one or more instructions may cause the one or more processors to identify, by using an object detection model to process the image of the vehicle, a set of vehicle characteristics of the vehicle. The one or more instructions may cause the one or more processors to generate an array of vectors by using a neural network to process image data that depicts at least a portion of the vehicle, wherein the array of vectors includes one or more vectors that represent a set of vehicle characteristics of the vehicle. The one or more instructions may cause the one or more processors to assign one or more weights to the one or more vectors based on the user interface interaction data. The one or more instructions may cause the one or more processors to determine a set of similarity scores that indicate similarities between the array of vectors and other arrays of vectors that include one or more other vectors relating to the set of vehicles, wherein the set of similarity scores are determined based on a similarity analysis of the one or more vectors and the one or more other vectors. The one or more instructions may cause the one or more processors to select a subset of the images of the set of vehicles based on the set of similarity scores. The one or more instructions may cause the one or more processors to cause the subset of the images to be displayed via at least one of the one or more interfaces of the vehicle search engine.

BRIEF DESCRIPTION OF THE DRAWINGS

FIGS. 1A-1E are diagrams of one or more example implementations described herein.

DETAILED DESCRIPTION

Figure 1A:
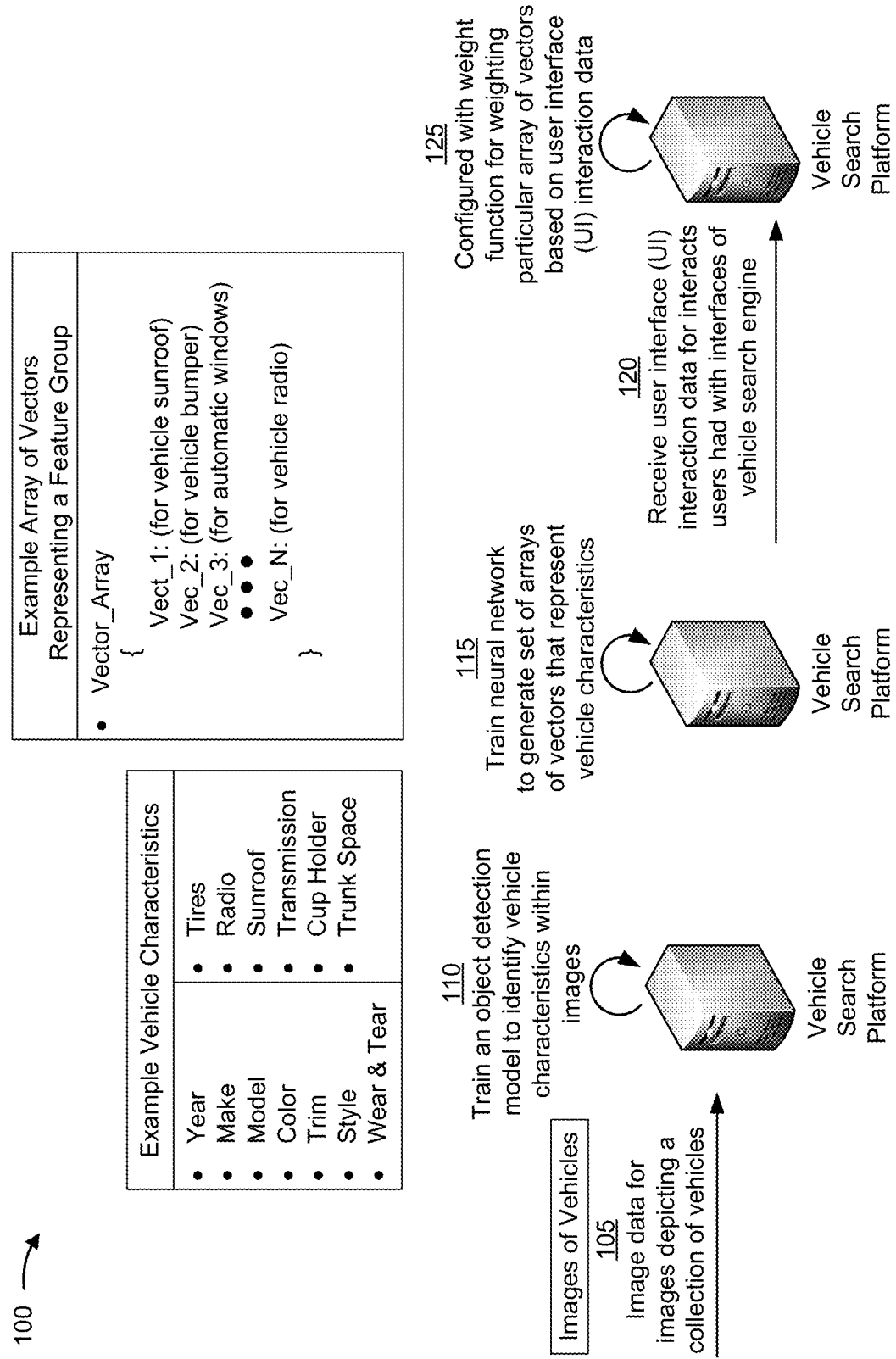

The following detailed description of example implementations refers to the accompanying drawings. The same reference numbers in different drawings may identify the same or similar elements.

A vehicle search engine may allow users to search for images of vehicles, vehicle descriptions corresponding to the images, and/or the like. In some cases, a vehicle search engine may be included as part of an application that allows users to purchase vehicles over the Internet. In these cases, the vehicle search engine may allow users to input search parameters to search for images of vehicles and/or vehicle description data that match the search parameters. As a specific example, a user may search for vehicles based on high-level vehicle characteristics, such as a year, make, and/or model of a vehicle, a color of a vehicle, a price or price range of a vehicle, and/or the like.

However, searching based on high-level vehicle characteristics may not provide the user with optimal search results. For example, the user may want to view images of vehicles that share vehicle characteristics that are not captured by image metadata for the images of the vehicles. To provide a specific example, a first user may want to view images of vehicles that have a sunroof, a second user may want to view images of vehicles that have a particular type of sunroof, a third user may want to view images of vehicles that have a particular feature of a sunroof, and/or the like. In many of these cases, the vehicle search engine will be unable to provide search results that satisfy needs of the user because the search results will be based on structured image metadata, which may not include image metadata that identifies vehicle characteristics that are specific enough to satisfy the needs of the user. This wastes resources (e.g., processing resources, network resources, memory resources, and/or the like) by identifying and providing a user device with sub-optimal search results that will not be of interest to the user and that are unlikely to assist the user in making a vehicle purchasing decision.

Some implementations described herein provide a vehicle search platform to use machine learning to identify one or more images of vehicles to recommend to a user that is accessing a vehicle search engine and to cause the one or more images to be displayed to the user via an interface of the vehicle search engine. For example, the user may, with a user device, access an interface of the vehicle search engine and may select and/or input one or more search parameters as part of a search request for one or more images of vehicles. In this case, the vehicle search platform may use the one or more search parameters to identify an initial set of vehicles and may cause images of the initial set of vehicles to be displayed via an interface of the vehicle search engine. The user may begin interacting with images of particular vehicles, such as by selecting an image of a vehicle and/or a vehicle component (e.g., a door, a radio, a sunroof, and/or the like), by zooming in on and/or zooming out of an image of a vehicle, by adjusting a camera view that affects an orientation of a vehicle in an image, and/or the like. This may cause user interface interaction data that identifies and/or describes the interactions made by the user to be provided to the vehicle search platform.

Additionally, the vehicle search platform may provide one or more images of vehicles with which the user interacted with as input to an object detection model to cause the object detection model to output one or more image crops that include labeled vehicle characteristics of the one or more vehicles. Additionally, the vehicle search platform may provide, as input to a data model that has been trained using machine learning (e.g., a neural network, such as a Siamese network). This may cause the data model to output an array of vectors that represent particular vehicle characteristics of the vehicles depicted in the one or more images (e.g., which may include vehicle characteristics of a lower level of granularity than the high-level vehicle characteristics described herein). Furthermore, the vehicle search platform may assign one or more weights to the array of vectors output by the data model. Moreover, the vehicle search platform may perform a similarity analysis on the array of vectors that includes one or more weighted vectors to determine a set of similarity scores that indicate a level of similarity between the array of vectors (that includes the one or more weighted vectors) and a stored set of arrays of vectors. The stored set of arrays of vectors may be based on interactions that other users made with interfaces of the vehicle search engine, vehicle characteristics of a repository of vehicles used for the vehicle search engine, and/or the like. In this case, the vehicle search platform may select the one or more images of vehicles to recommend to the user based on the set of similarity scores and may cause the one or more images of the vehicles to be displayed via an interface of the vehicle search engine.

In this way, the vehicle search platform efficiently and/or effectively provides the user with optimal search results. For example, by identifying vehicle characteristics that are of a lower-level of granularity than the high-level vehicle characteristics used by inferior solutions, and/or by identifying the one or more interactions with the interface of the vehicle search engine, the vehicle search platform identifies images of vehicles that are more likely to be of interest to the user. This conserves resources that may have otherwise been wasted to display sub-optimal search results that would not be of interest to the user, conserves resources that would be wasted when the sub-optimal results caused the user to continue searching for images of other vehicles, and/or the like.

Figure 1D:
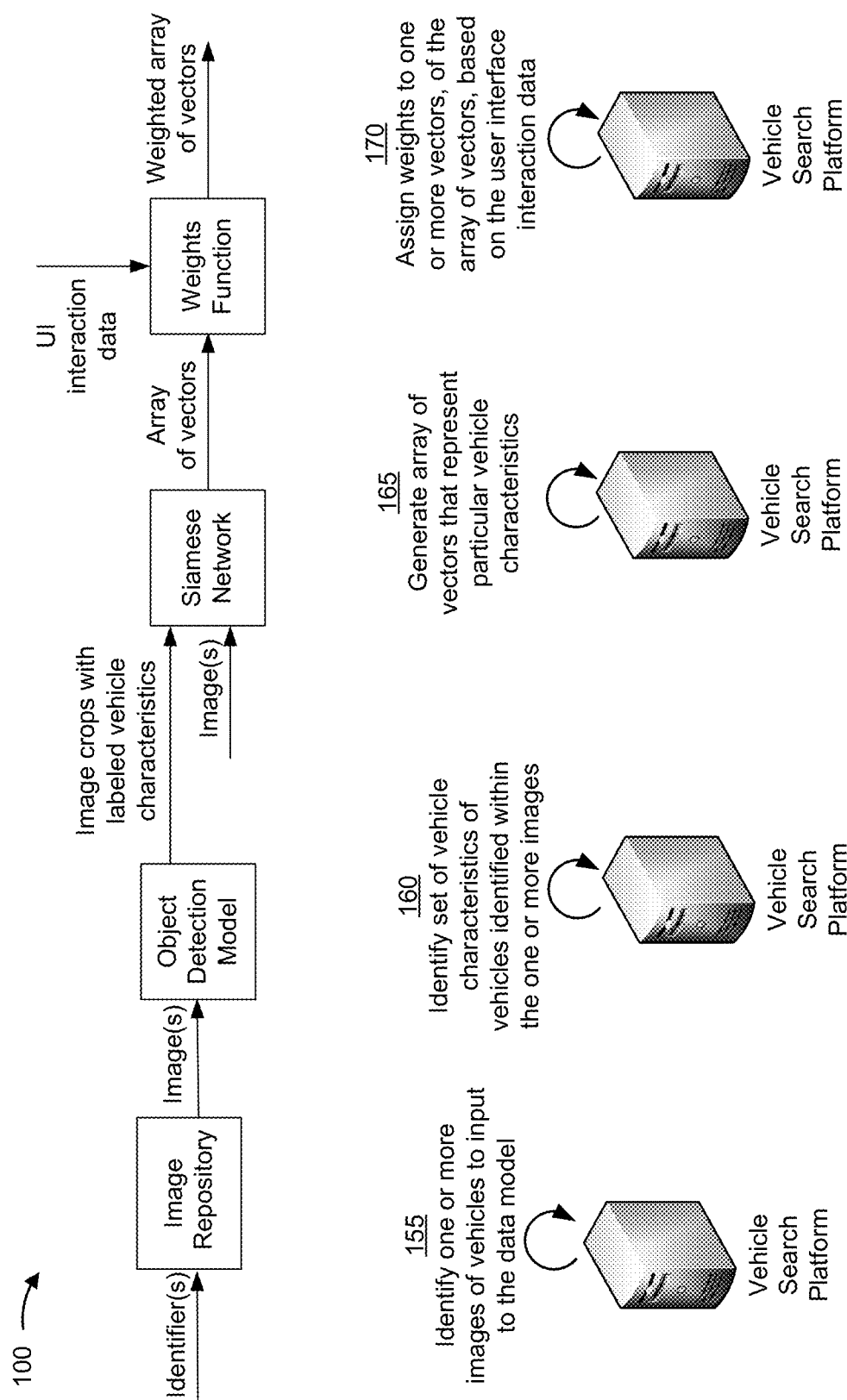
Figure 1E:
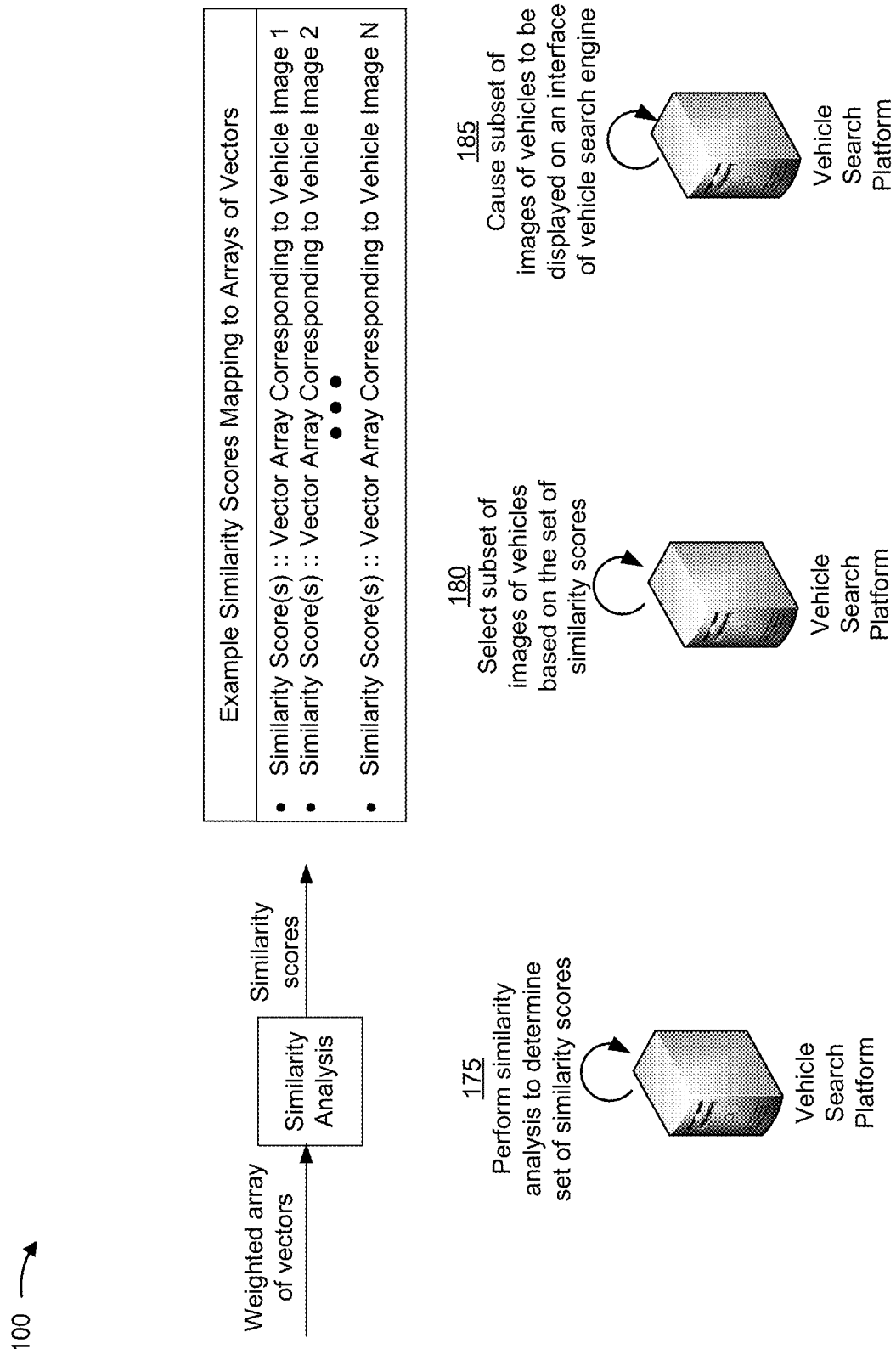

FIGS. 1A-1E are diagrams of one or more example implementations 100 described herein. Example implementation(s) 100 may include a vehicle search platform and a user device. As shown in FIGS. 1A and 1B, the vehicle search platform may train one or more data models and/or may be configured with one or more functions that may be used to identify images of vehicles to recommend to users. As shown in FIG. 1C-1E, a user may use the user device to access a vehicle search engine and the vehicle search platform may use the one or more data models and/or the one or more functions to identify one or more images of vehicles to recommend to the user.

The vehicle search engine may allow users to search for vehicles and may provide images of vehicles based on search parameters input by the users. In some implementations, the vehicle search engine may include one or more interfaces, such as an interface that allows users to input search parameters, an interface that displays a list of search results, one or more interfaces that display a particular search result (e.g., an image of a vehicle that has been selected from the list of search results), and/or the like.

In some implementations, the interface that allows users to input search parameters may allow users to input, as search parameters, a vehicle and/or a characteristic of a vehicle (e.g., by inputting free-form text), to select a vehicle and/or a characteristic of a vehicle (e.g., from a selectable menu of search filters displayed on the interface), and/or the like. Additionally, or alternatively, the interface may allow users to upload an image of a vehicle or of an image of a portion of a vehicle (e.g., a user device may capture and upload the image of the vehicle or the image of the portion of the vehicle), to select an image of a vehicle or an image of a portion of a vehicle (e.g., by interacting with displayed images of vehicles and/or vehicle components via the interface), and/or the like. In some cases, the user may provide data from multiple mediums and the provided data may be aggregated and used to search for a vehicle in a manner described herein.

In some implementations, the vehicle search engine may be part of an application (e.g., a web application, a mobile application, and/or the like) that allows users to obtain (e.g., purchase, rent, and/or the like) vehicles via a network such as the Internet. In some implementations, the vehicle search platform may host the application that allows users to purchase vehicles. In some implementations, the vehicle search platform may support the application that allows users to purchase vehicles (e.g., which may be hosted on an external server). For example, the user device may install a plugin that allows the user device to interact with the vehicle search platform in a manner that allows the vehicle search platform to identify the one or more images of vehicles to recommend and to instruct the vehicle search engine to display the one or more images.

As shown in FIG. 1A, and by reference number 105, the vehicle search platform may receive image data for images depicting a collection of vehicles. The images may be searchable via the vehicle search engine and the vehicle search platform may use the image data to train one or more data models (e.g., an object detection model, a neural network, and/or the like), as further described below.

The images may depict entire vehicles, portions of vehicles, specific components of vehicles, different angles of vehicles, and/or the like. For example, the images may include an image that depicts an exterior of a vehicle, an image that depicts an interior of a vehicle, an image that depicts an overhead view of a vehicle, an image that depicts a rearview of a vehicle, an image that depicts a front view of a vehicle, an image that depicts a side view of a vehicle, an image that depicts a portion of a vehicle (e.g., a part of an exterior of a vehicle, a part of an interior of a vehicle, a part of an engine compartment of a vehicle, a part of a trunk space of a vehicle, and/or the like), and/or the like.

In some implementations, the image data may identify a set of vehicle characteristics of particular vehicles depicted in the images. The set of vehicle characteristics may include a year of a vehicle, a make of a vehicle, a model of a vehicle, a color of a vehicle, a shade of a color of a vehicle, a trim of a vehicle, a style of a vehicle, a level of wear and tear of a vehicle, a component of a vehicle, a component type of a component of a vehicle, a sub-component of a component of a vehicle, an attribute of a component and/or a sub-component of a vehicle, and/or the like. For example, a vehicle may have a vehicle characteristic that specifies that the vehicle is green and/or may have a vehicle characteristic that specifies that the vehicle is a particular shade of green (e.g., light green, dark green, teal, and/or the like). As another example, a vehicle may have a vehicle characteristic that specifies a trim of the vehicle, such as a trim that includes an appearance package (e.g., that includes a specific color, a specific type of paint, a special interior fabric, a specific decal, and/or the like), a trim that includes a performance package (e.g., that includes an engine upgrade, a handling upgrade, a brakes upgrade, and/or the like), a trim that includes a safety package (e.g., that includes a collision avoidance system, electronic stability control, adaptive headlights, and/or the like), and/or the like.

As another example, a vehicle may have a vehicle characteristic that specifies a style of vehicle, such as a Sedan, a sports utility vehicle (SUV), a convertible, and/or the like. As another example, a vehicle may have a vehicle characteristic that specifies a level of wear and tear of a vehicle, such as by specifying a mileage of a vehicle, a physical defect of a vehicle, damage to a component and/or sub-component of a vehicle (e.g., a malfunctioning radio, a window that will not open, and/or the like), wear and tear of a component and/or a sub-component of a vehicle (e.g., a description of a tread of a tire, and/or the like), and/or the like.

As another example, a vehicle may have a vehicle characteristic that specifies a component of a vehicle, such as an engine, a trunk, a sunroof, a wheel, a door, and/or the like. As another example, a vehicle may have a vehicle characteristic that specifies a sub-component of an engine (e.g., a motor, a crankshaft, and/or the like), a sub-component of a trunk (e.g., a hinge, a tailgate, a control mechanism, and/or the like), a sub-component of a sunroof (e.g., a glass panel, a motor, a frame, a control mechanism, and/or the like), and/or the like. As another example, a vehicle may have a vehicle characteristic that specifies an attribute of an engine and/or a component of an engine (e.g., a type of engine, a type of motor used for the engine, an advertised horsepower of the engine, and/or the like), an attribute of a trunk and/or a component of a trunk (e.g., a type of trunk, a type of hinge, an attribute specifying a functionality of a control mechanism of the trunk, and/or the like), an attribute of a sunroof and/or a component of a sunroof (e.g., a type of glass panel, an attribute specifying a functionality of a control mechanism of the sunroof, and/or the like), and/or the like.

As shown by reference number 110, the vehicle search platform may train an object detection model to identify vehicle characteristics within images. For example, the vehicle search platform may use one or more machine learning techniques, one or more image processing and/or computer vision techniques, and/or the like, to train an object detection model to receive an image that depicts a vehicle and to output data that identifies particular vehicle characteristics found within the image.

In some implementations, the vehicle search platform may process the image data to determine a set of vehicle characteristics that may be used to train the object detection model. For example, the vehicle search platform may process the images that depict the collection of vehicles using the one or more image processing and/or computer vision techniques to identify a set of vehicle characteristics that may be used to train the object detection model. To provide a few examples, the vehicle search platform may determine the set of vehicle characteristics by processing the images using an appearance-based image processing technique (e.g., an edge matching technique, a divide-and-conquer technique, a matching technique, a technique using histograms, and/or the like), using a feature-based image processing technique (e.g., a corner detection technique, a structure tensor technique, a feature description technique, and/or the like), and/or the like.

To be able to train an object detection model that is able to identify specific vehicle characteristics of a vehicle depicted in an image, the vehicle search platform may use the one or more image processing and/or computer vision techniques to process a set of images of vehicles that are available as training data. As an example, the vehicle search platform may use the one or more image processing and/or computer vision techniques to process an image of a convertible to identify specific vehicle characteristics of the convertible, such as a sunroof, a spoiler, a gear shifter, and/or the like. This may allow the vehicle search platform to generate image metadata for the image that identifies the specific vehicle characteristics, that identifies features of the specific vehicle characteristics (e.g., a sunroof, a type of sunroof, a low-level characteristic of a sunroof, such as a shape of a sunroof or a pattern in a sunroof, and/or the like), and/or the like. The image metadata may be stored in association with the image and/or an identifier of the image as part of a labeled dataset that may be used to train the object detection model.

In some implementations, the vehicle search platform may receive image metadata identifying and/or describing one or more vehicle characteristics. For example, the vehicle search engine may have previously included a search feature that allows users to search for vehicles based on a first group of vehicle characteristics that are of a first level of granularity and that identify and/or describe high-level vehicle characteristics. The first group of vehicle characteristics may include vehicle characteristics that specify a year of a vehicle, a make of a vehicle, a model of a vehicle, a color of a vehicle, and/or the like. However, because the search feature may not have previously allowed users to search by more specific vehicle characteristics, the vehicle search platform may determine one or more additional vehicle characteristics that are of one or more other levels of granularity and that are more specific than the first group of vehicle characteristics. The one or more additional vehicle characteristics may include a shade of a color of a vehicle, a trim of a vehicle, a style of a vehicle, a component of a vehicle, a type of component of a vehicle, a sub-component of a vehicle, an attribute of a component and/or a sub-component of a vehicle, and/or the like. This may allow the vehicle search platform to use the one or more additional vehicle characteristics when training the object detection model.

In some implementations, the vehicle search platform may use one or more machine learning techniques and/or the labeled dataset (e.g., that identifies particular vehicles and/or particular characteristics within images) to train the object detection model. For example, the vehicle search platform may train the object detection model to receive an image as an input and to output one or more image crops that include predicted vehicle characteristics (e.g., which are predicted by the object detection model to be present in an image), to output scores that indicate likelihoods of the image including particular vehicle characteristics, and/or the like.

In some implementations, the vehicle search platform may detect vehicle characteristics that are not classified as objects (e.g., and therefore may not be detectable by the object detection model). For example, the vehicle search platform may determine a first set of vehicle characteristics using the object detection model and may determine a second set of vehicle characteristics using one or more other computer vision techniques. The second set of vehicle characteristics may include particular vehicle characteristics that are not detectable by the object detection model, such as a color of a vehicle, a year of the vehicle, a model of the vehicle, a make of the vehicle, and/or the like. In this case, the first set of vehicle characteristics may be used for training a neural network, such as a Siamese network, and the second set of vehicle characteristics may be used to filter search results of the image search engine, as will be described further herein.

As shown by reference number 115, the vehicle search platform may train a neural network to generate a set of arrays of vectors that represent vehicle characteristics of vehicles that are depicted by a collection of images that are capable of being displayed by the vehicle search engine. For example, the vehicle search platform may train the neural network to receive, as input data, one or more image crops with labeled vehicle characteristics for the vehicle (and/or a complete image of the vehicle) (e.g., which may be an output of the object detection model), and may process the input data to output an array of vectors that serve as a numerical representation of particular vehicle characteristics that have been identified. The vehicle search platform may use the trained neural network to generate a set of arrays of vectors that collectively represent all (or some) vehicle characteristics that have been identified in the collection of images of vehicles. The one or more machine learning techniques may include a classification-based technique, a regression-based technique, a clustering-based technique, and/or the like.

In some implementations, the vehicle search platform may use image crops with particular vehicle characteristics to train the neural network. For example, the vehicle search platform may provide two image crops that include the same vehicle characteristics (e.g., two image crops that include a sunroof of a vehicle) as input to the neural network (e.g., at the same time, separately, and/or the like) and the neural network may be configured to convert each respective image crop into a vector that represents one or more vehicle characteristics depicted by the image crop (e.g., a vector that represents a given sunroof). The first time that the neural network outputs vectors, the vectors may not include similar values. However, the neural network may be trained by adjusting weights and/or values that affect the vectors that are generated, such that accuracy of the neural network is improved over time. For example, weights of the neural network may be adjusted, such that if the same two image crops are processed by the neural network a number of different times, the vectors that the neural network outputs for each respective image crop may have values that grow closer over time (e.g., until the neural network is able to identify two image crops as similar by generating two identical or similar vectors for each respective image crop).

In some cases, a cosine similarity analysis or a similar type of similar analysis may be used while training the neural network. If a first vector and a second vector do not satisfy a threshold level of similarity with each other, neural network may adjust a weights function and continue to process training data. If the threshold level of similarity is satisfied, the vehicle search platform may store the vectors in association with each respective image crop, with identifiers of each respective image crop, with data that identifies the particular vehicle characteristics identified in each respective image crop, and/or the like. In this way, the neural network may be trained to receive an image of a vehicle and/or one or more image crops that include vehicle characteristics identified by the object detection model, and to output an array of vectors that represent particular vehicle characteristics identified in the image and/or in the one or more image crops. The vehicle search platform may then use the output to reference a data structure used to store the associations to identify which vehicles have similar vehicle characteristics to a particular vehicle that a user is interacting with, as will be further described in connection with FIG. 1D.

As a specific example, the vehicle search platform may train an artificial neural network, such as a Siamese network. The Siamese network may have an input layer, one or more intermediate layers (e.g., a fully connected layer, a convolutional layer, a pooling layer, a recurrent layer, and/or the like), and an output layer. For example, a set of vehicle characteristics may be hyperparameters that are used as part of a cost function of the Siamese network. In this case, the vehicle search platform may perform a feedforward technique to provide two or more images of vehicles and/or two or more images crops associated with portions of an image as an input to the Siamese network, and the Siamese network may output an array of vectors that includes vectors representing vehicle characteristics identified in a first image or image crop and a second array of vectors that includes vectors representing vehicle characteristics identified in a second image or image crop.

Additionally, the vehicle search platform may compare the array of vectors and the second array of vectors (e.g., using a cosine similarity analysis) to determine an error value based on the comparison. The error value may be used to update the cost function (e.g., which may assign weights to particular vehicle characteristics, which may dictate which numerical values are output by the neural network, and/or the like), and the vehicle search platform may perform a backpropagation technique to iteratively train the Siamese network until a threshold level of accuracy has been reached.

As shown by reference number 120, the vehicle search platform may receive user interface interaction data for interactions that users had with one or more interfaces of the vehicle search engine. For example, while searching for images of particular vehicles, users may have interacted with one or more interfaces of the vehicle search engine. This may have caused user interface interaction data to be generated and provided to the vehicle search platform. The user interface interaction data may identify one or more search parameters that were input by a user while searching for an image of a vehicle, may identify a time at which a search parameter was input, may identify a specific part of an image of a vehicle that a user interacted with (e.g., clicked on, selected, zoomed in on and/or zoomed out of, and/or the like) while searching for a vehicle, may identify a time at which an interaction with an image of a vehicle occurred, may identify a sequence of interactions over a given time period, and/or the like. The user interface interaction data may be used as part of a weight function for weighting arrays of vectors output by the neural network, as described further herein.

In some implementations, user devices may generate and provide the vehicle search platform with user interface interaction data. For example, a user may use a first user device to access the vehicle search engine and to search for images of vehicles. In this case, the user may input one or more search parameters as part of a search request, which may cause the vehicle search engine to display an initial set of search results. The initial set of search results may be displayed via an interface of the vehicle search engine and, over time, the user may interact with one or more images of vehicles that are displayed via the interface. This may cause the first user device (e.g., using a plugin of the vehicle search engine) to generate and provide the vehicle search platform with user interface interaction data that identifies and/or describes the interactions made by the user.

As another example, a user may input one or more search parameters as part of a search request. This may cause the vehicle search engine to present an initial set of vehicles that are based on the one or more search parameters input by the user. The user may then select an image of a vehicle, select a component of a vehicle, zoom in and/or zoom out of the image of the vehicle and/or the component of the vehicle, return to an interface displaying the initial set of vehicles to select a different vehicle, and/or the like. In this example, if the user selects a vehicle, of the initial set of vehicles, the interface may update to display a larger image of the vehicle and a first user device may generate and provide the vehicle search platform with user interface interaction data identifying and/or describing the interaction made by the user.

Continuing with the example, if the user then selects a component of the vehicle, the interface may update to display a larger image of the component of the vehicle and the first user device may generate and provide the vehicle search platform with user interface interaction data identifying and/or describing the interaction with the component of the vehicle. In some cases, the first user device may generate user interface interaction data that identifies and/or describes a sequence of interactions that the user has with one or more interfaces over a given time period. In other cases, the vehicle search platform may generate the user interface interaction data that identifies and/or describes the sequence of interactions (e.g., based on receiving, over time, user interface interaction data for individual interactions with the one or more interfaces).

As shown by reference number 125, the vehicle search platform may be configured with a weight function for weighting particular array of vectors based on user interface interaction data. For example, the vehicle search platform may be configured with a weight function that assigns weights to particular vectors, of an array of vectors output by the neural network, based on the particular vectors corresponding to particular vehicle characteristics that had been interacted with by a user. Consequently, if a user interacts with an image of a vehicle that is displayed on an interface of the vehicle search engine, and the array of vectors output by the neural network represents a set of vehicle characteristics of the vehicle, the weight function may be used to assign higher weights to particular vehicle characteristics that the user is interacting with, such that the array of weighted vectors may be used to search for images of vehicles that are predicted to be preferred by the user.

In some implementations, the vehicle search platform may receive additional data that may be used to weight vectors that are output by the neural network. For example, the vehicle search platform may receive user preferences data for one or more users that have previously accessed the vehicle search engine. The user preferences data may specify a preferred vehicle, a preferred vehicle characteristic (defined below), a preferred price or price range, and/or the like. In this case, the vehicle search platform may adjust one or more of the assigned weights based on the user preferences data. In some implementations, the vehicle search platform may use the user preferences data as a separate filter that may be used to filter the set of arrays of vectors that represent the collection of vehicles that are searchable via the image search engine.

In this way, the vehicle search platform trains one or more data models and/or is configured with one or more functions that may be used to identify one or more images of vehicles to recommend to a user.

As shown in FIG. 1B, and as shown by reference number 130, the vehicle search platform may store the set of arrays of vectors in association with identifiers associated with the collection of vehicles. For example, the vehicle search platform may store each array of vectors, of the set of arrays of vectors generated via the neural network, in association with an identifier associated with each vehicle that is identified in particular input datasets. The identifiers may be vehicle identifiers for the collection of vehicles, image identifiers for the images that depict the collection of vehicles, storage location identifiers that indicate storage locations for the images depicting the collection of vehicles, and/or the like. When the vehicle search platform generates a new array of vectors based on a new input dataset (e.g., a new user accessing the vehicle search engine), the vehicle search platform may reference the set of arrays of vectors when performing a similarity analysis to determine that particular arrays of vectors, of the set of arrays of vectors, are similar to the new array of vectors that has been generated. The vehicle search platform may use the associations with the identifiers to identify images of vehicles to recommend to a user, as described further herein.

As shown by reference number 135, the vehicle search platform may be configured with a set of filtering techniques that may be used to filter the set of arrays of vectors. For example, if a user is interacting with the vehicle search engine, the vehicle search platform may use the neural network and the weight function to generate an array of vectors that includes vectors that have been weighted and may perform a similarity analysis that compares the array of vectors to each vector in the set of arrays of vectors. However, if the vehicle search platform is configured with a set of filtering techniques that may filter the set of arrays of vectors, the vehicle search platform may only have to perform the similarity analysis on a subset of the set of arrays of vectors (e.g., thereby conserving resources relative to performing the similarity analysis on all arrays of vectors in the set). The set of filtering techniques may include a vehicle orientation filtering technique, a layered vehicle characteristic filtering technique, and/or the like, as each described below.

In some implementations, the vehicle search platform may be configured with the vehicle orientation filtering technique. The vehicle orientation filtering technique may be used to filter the set of arrays of vectors that are used as part of the similarity analysis performed by the vehicle search engine (described further herein). For example, if a user is interacting with an image of a vehicle that is displayed on an interface of the vehicle search engine, and the vehicle has a first orientation within the image, the vehicle search platform may filter the set of arrays of vectors in a manner that excludes one or more arrays of vectors that relate to images of vehicles that are oriented in a manner that is different than the first orientation.

As a specific example, while navigating through one or more interfaces of the vehicle search engine, a user may select a first vehicle that has a first orientation within a first image and may select a second vehicle that has the first orientation within a second image. This may cause the vehicle search platform to use the neural network and the weight function to generate an array of vectors that include one or more vectors that have been weighted based on one or more interactions that the user had with the first image and/or the second image. In this example, the vehicle search platform may, before performing the similarity analysis to compare the array of vectors (that includes the one or more vectors that have been weighted) and the set of arrays of vectors, perform the vehicle orientation filtering technique to filter the set of arrays of vectors based on the identified first orientation of the first vehicle and the second vehicle. To filter the set of arrays of vectors, the vehicle search platform may identify particular arrays of vectors that correspond to vehicles that have an orientation within images that are different than the first orientation. This may allow the vehicle search platform to perform the similarity analysis in a manner that excludes the particular arrays of vectors that have been identified as having an orientation within images that is different than the first orientation.

In some implementations, the vehicle search platform may be configured with the layered vehicle characteristic filtering technique. The layered vehicle characteristic filtering technique may be used to filter the set of arrays of vectors that are used in the similarity analysis performed by the vehicle search engine (described further herein). For example, if a user interacts with an image of a vehicle that is displayed on an interface of the vehicle search engine, the vehicle search platform may use the neural network to generate an array of vectors that includes one or more vectors that represent a set of vehicle characteristics of the vehicle. The set of vehicle characteristics may include a first subset of vehicle characteristics that are of a first level of granularity and a second subset of vehicle characteristics that are of one or more other levels of granularity.

To filter the set of arrays of vectors, the vehicle search platform may use the layered vehicle characteristic filtering technique to identify particular arrays of weighted vectors, of the set of arrays of vectors, that include vectors representing one or more vehicle characteristics that are part of the second subset of vehicle characteristics. This may allow the vehicle search platform to perform the similarity analysis on the particular arrays of vectors, thereby reducing a utilization of resources relative to performing the similarity analysis on the entire set of arrays of vectors.

While the set of filtering techniques are described as being performed before the vehicle search platform performs the similarity analysis, it is to be understood that this is provided by way of example. In practice, in some cases, the set of filtering techniques may be implemented as part of the similarity analysis, as part of another data model that performs the similarity analysis (e.g., as a module of the second data model, a layer in a neural network, and/or the like), and/or the like.

As shown by reference number 140, the vehicle search platform may be configured to perform the similarity analysis that may be used to select one or more images to recommend to users. For example, a user may interact with an interface of the vehicle search engine, which may cause the vehicle search platform to use the object detection model, the neural network, and/or the weight function to generate an array of vectors that include one or more vectors that have been weighted based on user interface interaction data. In this case, the vehicle search platform may perform the similarity analysis to compare the array of vectors that include the one or more vectors that have been weighted with each array of vectors in the set of arrays of vectors. The similarity analysis may be performed using a set of rules, using a second data model, and/or the like, as each described below.

In some implementations, the vehicle search platform may be configured with a set of rules that may be used to perform a similarity analysis. For example, the vehicle search platform may be configured with a first rule that allows the vehicle search platform to compare an array of vectors (e.g., which may be output by the neural network) and/or an array of vectors that has been weighted by the weight function with each array of vectors in the set of arrays of vectors. In some cases, the vehicle search platform may assign a similarity score to each array of vectors in the set (e.g., based on a level of similarity between each array of vectors and the array of vectors output by the neural network, based on a similarity analysis that utilizes the one or more weights, and/or the like). Additionally, the vehicle search platform may be configured with a second rule that allows the vehicle search platform to compare similarity scores to a threshold similarity score and to identify one or more arrays of vectors in the set that have a similarity score that satisfies the threshold similarity score. The one or more arrays of vectors may correspond to particular images of vehicles that the vehicle search platform selects as images of vehicles to be recommended to a user.

In some implementations, the vehicle search platform may train another data model to determine similarity scores that may be used to select images of vehicles to recommend to users. For example, the vehicle search platform may train another data model to determine similarity scores between an array of vectors (e.g., that may be output by neural network) and other arrays of vectors that are part of the set of arrays of vectors. In this case, the other data model may be trained in a manner that is able to receive an array of vectors as an input (e.g., the output of the data model) and may determine similarity scores that indicate a level of similarity between the array of vectors and the other arrays of vectors of the set of arrays of vectors. The other data model may be trained using one or more machine learning techniques, such as a regression-based technique (e.g., a linear regression technique, a logistical regression technique, and/or the like), a clustering-based technique (e.g., a K-means clustering technique, a density-based spatial clustering of applications with noise (DBSCAN) technique, and/or the like), a technique using a neural network, and/or the like.

In this way, the vehicle search platform may be configured to perform a similarity analysis that may be used to select one or more images of vehicles to recommend to users.

As shown in FIG. 1C, and by reference number 145, the user device may generate user interface interaction data based on a user interacting with one or more interfaces of the vehicle search engine. For example, the user may use the user device to access the one or more interfaces of the vehicle search engine and may navigate through the one or more interfaces to search for images of vehicles. This may cause the user device to generate user interface interaction data that identifies and/or describes one or more interactions that the user makes with the one or more interfaces, as further described below. In some cases, the vehicle search engine may be part of an application (e.g., a web application, a mobile application, and/or the like) that allows users to purchase vehicles via the Internet, and the user may use the vehicle search engine to view images of vehicles that the user is considering obtaining (e.g., purchasing, renting, and/or the like).

In some implementations, the user may use the user device to input one or more search parameters as part of a search query. For example, the user device may display an interface used to submit the search query and may allow the user to input one or more search parameters as part of the search query. In this case, the user may select a search parameter (e.g., from a drop-down menu, from a list of available search parameters, and/or the like), may input free-form text as a search parameter, and/or the like. The one or more search parameters may include a search parameter for a vehicle characteristic, a search parameter for a user preference (as shown below), and/or the like.

In some implementations, the vehicle search platform may cause an interface used to submit the search query to display one or more search parameters that are based on one or more user preferences of the user. For example, when the user logs in to the application, an identifier for the user may be provided to the vehicle search platform. This may allow the vehicle search platform to identify one or more user preferences and to cause the interface that displays the search query to display a selectable search parameter that is based on a particular user preference, to display a pre-selected search parameter that has been pre-selected based on a particular user preference, and/or the like.

In some implementations, when the user submits a search query, the vehicle search platform may cause an interface of the vehicle search engine to display an initial set of vehicles. For example, the user device may submit a search query, which the vehicle search platform may use to identify images of an initial set of vehicles that may be displayed via the interface. In the example shown in FIG. 1C, the interface may display images of six vehicles (shown as Vehicle 1 Image, Vehicle 2 Image, Vehicle 3 Image, Vehicle 4 Image, Vehicle 5 Image, and Vehicle 6 Image).

In some cases, the vehicle search platform may cause an interface of the vehicle search engine to display an initial set of vehicles prior to the user submitting the search query. For example, the vehicle search platform may cause images of an initial set of vehicles to be displayed as soon as the user loads the interface of the vehicle search engine, after the user logs in to a user profile, and/or the like. In this way, the vehicle search platform conserves resources relative to requiring the user to submit a search query to trigger the process flow described herein.

In some implementations, the user device may generate user interface interaction data based on one or more interactions that the user has with one or more interfaces of the vehicle search engine. For example, the user may use the user device to interact with an interface, to perform a sequence of interactions with an interface (e.g., over a given time period), and/or the like. As the user interacts with an interface, the user device may generate user interface interaction data that identifies and/or describes the interaction. The user interface interaction data may identify a vehicle and/or an image that the user interacted with, may identify a location in the image (e.g., a pixel, a group of pixels, etc.) that identifies a specific component of the vehicle that the user interacted with, may identify a type of interaction made by the user (e.g., a click, an action to zoom in, an action to zoom out, a mouseover, and/or the like), and/or the like. In some cases, the vehicle search platform may generate the user interface interaction data (e.g., instead of the user device, in addition to the user device, and/or the like).

In the example shown, the user may use the user device to select Vehicle 3 Image, which may cause an interface of the vehicle search engine to display the Vehicle 3 Image. The user may use the user device to select an overhead view configuration which may cause an interface to display an overhead view of Vehicle 3. Next, the user may use the user device to click on a glass panel of a sunroof, which may cause an interface of the vehicle search engine to display a zoomed-in view of the sunroof. Next, the user may use the user device to return to the interface that displays the initial set of vehicles and may select Vehicle 4 Image. The user may use the user device to select an interior view configuration which may cause an interface to display an interior of Vehicle 4. Next, the user may use the user device to select a gear shifter, which may cause an interface to display a zoomed-in view of the gear shifter and/or to display information specifying a type of transmission, a number of available gears, and/or the like. In this example, each interaction made by the user may cause the user device to generate user interface interaction data that identifies and/or describes the respective interactions.

As shown by reference number 150, the user device may provide the user interface interaction data for one or more interactions with the one or more interfaces to the vehicle search platform. For example, when the user submits the search query, search query data (e.g., which may be said to be part of user interface interaction data) may be provided to the vehicle search platform. Additionally, or alternatively, and provided as another example, when the user interacts with an interface of the vehicle search engine, such as by selecting a vehicle or a component of a vehicle, user interface interaction data may be provided to the vehicle search platform. The user interface interaction data may be provided to the vehicle search platform after each interaction, may be provided to the vehicle search platform periodically (e.g., based on configured time intervals), and/or the like.

In this way, the vehicle search platform may be provided with user interface interaction data that may be used to identify images of vehicles to display to the user.

As shown in FIG. 1D, and by reference number 155, the vehicle search platform may identify one or more images of vehicles to input to the object detection model. For example, the user interface interaction data may include an identifier associated with an image of a vehicle that the user interacted with while navigating through the one or more interfaces of the vehicle search engine. In this case, the vehicle search platform may use the identifier to identify the image of the vehicle. The vehicle search platform may repeat these steps to identify all (or some) of the images of vehicles that the user interacted with while navigating through the one or more interfaces of the vehicle search engine.

As shown by reference number 160, the vehicle search platform may identify a set of vehicle characteristics associated with vehicles identified in the one or more images. For example, the vehicle search platform may provide, as input to the object detection model, the one or more images of the vehicles to cause the object detection model to output a set of images crops that identifies the set of vehicle characteristics (e.g., each image crop may include labels that identify particular vehicle characteristics that are present in a given image crop). The set of image crops may be used as an input to a neural network, such as a Siamese Network, as further shown below.

In some implementations, the vehicle search platform may identify one or more additional vehicle characteristics. For example, some vehicle characteristics, such as a color of the vehicle, may not be an object and therefore may not be detectable by the object detection model. In this case, the vehicle search platform may use another function or model to determine the color the vehicle (and/or any other vehicle characteristics that may be detectable by processing image data).

As shown by reference number 165, the vehicle search platform may generate an array of vectors that represent particular vehicle characteristics. For example, the vehicle search platform may provide, as input to the neural network, the one or more images of vehicles and/or image crops with labeled vehicle characteristics (collectively referred to as an input dataset) to cause the data model to output an array of vectors that represent particular vehicle characteristics of the vehicle.

As an example, the vehicle search platform may provide the input dataset to a Siamese Network. This may cause one or more intermediary layers of the Siamese network to process the input dataset to generate the array of vectors. For example, two or more image crops may be provided to one or more intermediary layers of the Siamese network, which may process the two or more image crops and output the array of vectors representing the particular vehicle characteristics. The array of vectors may be provided to an output layer of the Siamese network.

As shown by reference number 170, the vehicle search platform may assign weights to one or more vectors, of the array of vectors, based on user interface interaction data. For example, the vehicle search platform may execute the weight function to assign weights to one or more vectors, of the array of vectors, based on the user interface interaction data. The output of the weight function may be an array of weighted vectors, where each vector in the array has been assigned a weight (e.g., a first vector corresponding to a vehicle characteristic that the user interacted with may be assigned a higher weight than a second vector corresponding to another vehicle characteristic that the user did not interact with).

As a specific example, an image of a vehicle may include ten vehicle characteristics and the user may have interacted with the user interface to select a first vehicle characteristic (e.g., a sunroof). In this example, the vehicle search platform may assign a higher weight to the first vehicle characteristic than to other vehicle characteristics that the user did not select when interacting with the user interface. The array of vectors that includes the one or more weighted vectors may be used as part of a similarity analysis, as will be described further herein.

One or more implementations described herein may be performed using multiple data models and/or functions. For example, as described above, the object detection model may be used to identify the set of vehicle characteristics of vehicles identified within the one or more images and a neural network (e.g., the Siamese Network) may be used to generate the array of vectors. Furthermore, the weights function may be used to assign weights to the array of vectors. It is to be understood that this is provided by way of example, and that in practice, a single data model may include features and/or functions needed to perform all (or some) of the actions described as being performed by the multiple data models and/or functions.

In some cases, the weights function may be implemented as part of a data model (e.g., as a layer in the neural network). In these cases, the user interface interaction data may be processed by a layer of the neural network and the neural network may output an array of vectors that has been weighted by the neural network.

In this way, the vehicle search platform generates the array of vectors that includes the one or more weighted vectors and that may be used to identify images of vehicles to display to the user.

As shown in FIG. 1E, and by reference number 175, the vehicle search platform may perform the similarity analysis to determine a set of similarity scores. For example, the vehicle search platform may perform the similarity analysis (e.g., using the set of rules, the other data model, and/or the like) to determine a set of similarity scores that may be used to select images of vehicles to display to the user. In this case, the vehicle search platform may compare the array of vectors that include the one or more weighted arrays output by the weights function with other arrays of vectors that are part of the set of arrays of vectors and may generate the set of similarity scores based on the comparison. The set of similarity scores may represent a level of similarity between the array of weighted vectors and each of the other arrays of vectors, may represent a level of similarity between vectors that are part of the array of weighted vectors and one or more other vectors that are part of the other arrays of vectors, and/or the like.

As an example, the vehicle search platform may use the other data model to determine the set of similarity scores. In this example, the vehicle search platform may provide the array of vectors as input to the other data model to cause the other data model to output a set of similarity scores that may be used to select one or more images of vehicles to display to the user.

In some implementations, the vehicle search platform may filter the set of arrays of vectors (e.g., before determining the set of similarity scores). For example, the vehicle search platform may perform one or more filtering techniques (e.g., the vehicle orientation filtering technique, the layered vehicle characteristic filtering technique, and/or the like) that may reduce a utilization of resources needed to perform the similarity analysis.

As an example, the vehicle search platform may perform a vehicle orientation filtering technique to filter the set of arrays of vectors that are to be used as part of the similarity analysis. For this example, assume the data model has generated an array of vectors that include weighted vectors that represent particular vehicle characteristics of a vehicle depicted in an image that the user interacted with while navigating through the vehicle search engine. The vehicle may have a first orientation within the image. Furthermore, each of the collection of vehicles that are searchable via the vehicle search engine (e.g., which correspond to the set of arrays of vectors) may have particular orientations with images. In this example, the vehicle search platform may perform the vehicle orientation filtering technique to identify one or more arrays of vectors, of the set of arrays of vectors, that correspond to one or more vehicles, of the collection of vehicles, that are positioned within images using the first orientation. This may allow the vehicle search platform to perform the similarity analysis on a subset of the set of arrays of vectors, thereby reducing a utilization of resources relative to performing the similarity analysis on the entire set of arrays of vectors.

Additionally, or alternatively, and provided as another example, the vehicle search platform may perform the layered vehicle characteristic filtering technique. For this example, assume an array of vectors represent particular vehicle characteristics of a vehicle depicted in an image that the user interacted with while navigating through the vehicle search engine. The particular vehicle characteristics may include a first group of vehicle characteristics of the vehicle that are of a first level of granularity and a second group of vehicle characteristics that are of one or more other levels of granularity (e.g., a level of granularity that is more specific than the first level of granularity).

To filter the set of arrays of vectors, the vehicle search platform may use the layered vehicle characteristic filtering technique to identify particular arrays of vectors, of the set of arrays of vectors, that include vectors representing the second group of vehicle characteristics that are of one or more other levels of granularity. This may allow the vehicle search platform to perform the similarity analysis on the particular arrays of vectors, thereby reducing a utilization of resources relative to performing the similarity analysis on the entire set of arrays of vectors.

As shown by reference number 180, the vehicle search platform may select a subset of images of vehicles based on the set of similarity scores. For example, each array of vectors, of the set of arrays of vectors, may have a similarity score and may correspond to one or more images of vehicles. In this case, the vehicle search platform may determine that one or more similarity scores, of the set of similarity scores, satisfy a threshold similarity score. This may allow the vehicle search platform to reference a data structure that maps arrays of vectors and images of the collection of vehicles and to select a subset of the images that map to particular arrays of vectors that have similarity scores that satisfy the threshold similarity score.

As shown by reference number 185, the vehicle search platform may cause the subset of images of vehicles to be displayed on an interface of the vehicle search engine. For example, the vehicle search platform may cause the subset of images of vehicles to be displayed such that the user may view the subset of images of vehicles, may interact with the subset of images of vehicles, may make a vehicle purchasing decision based on the subset of images of vehicles, and/or the like.

In some implementations, the vehicle search platform may cause the subset of images of vehicles to be displayed in an order that is based on the set of similarity scores. For example, the vehicle search platform may cause the subset of images to be displayed such that the subset of images of vehicles may be displayed in ascending order (e.g., such that an image of a vehicle associated with a highest available similarity score is displayed at a top-most portion of the interface), descending order, and/or the like.

In this way, the vehicle search platform efficiently and/or effectively provides the user with optimal search results. For example, by identifying vehicle characteristics that are of a lower level of granularity than high-level vehicle characteristics used by inferior solutions, and/or by identifying the one or more interactions that the user has with the one or more interfaces of the vehicle search engine, the vehicle search platform identifies images of vehicles that are more likely to be of interest to the user. This conserves resources that may have otherwise been wasted to display sub-optimal search results that would not be of interest to the user, conserves resources that would be wasted when the sub-optimal results caused the user to continue searching for images of other vehicles, and/or the like.

As indicated above, FIGS. 1A-1E are provided merely as one or more examples. Other examples may differ from what is described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
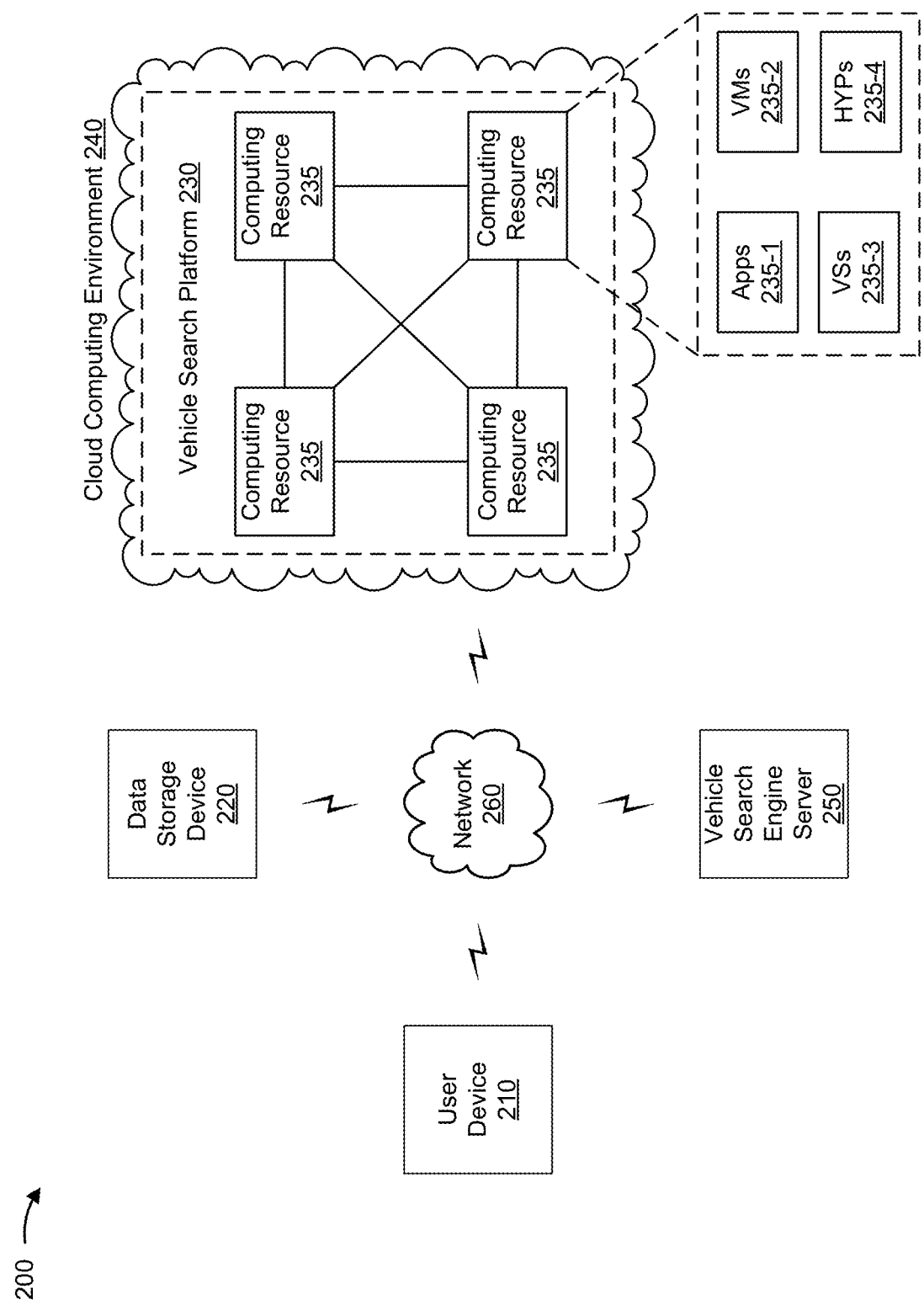
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user device 210, a data storage device 220, a vehicle search platform 230 hosted within a cloud computing environment 240, a vehicle search engine server 250, and/or a network 260. Devices of environment 200 may interconnect via wired connections, wireless connections, or a combination of wired and wireless connections.

User device 210 includes one or more devices capable of receiving, generating, storing, processing, and/or providing information associated with a vehicle search engine. For example, user device 210 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, smart clothing, and/or the like), or a similar type of device.

In some implementations, user device 210 may provide, to vehicle search platform 230 and/or to vehicle search engine server 250, a search query to search for one or more vehicles that may be displayed via an interface of the vehicle search engine. In some implementations, user device 210 may receive, from vehicle search platform 230 and/or vehicle search engine server 250, search results that may be displayed on an interface of the vehicle search engine. In some implementations, an interface of the vehicle search engine, which is displayed on user device 210, may update to display images of one or more vehicles that have been recommended by vehicle search platform 230. In some implementations, user device 210 may host an application that includes the vehicle search engine. For example, user device 210 may install an application (e.g., a desktop application, a mobile application, and/or the like) that allows users to search for vehicles that are available for purchase, where the vehicle search engine is provided as a service of the application.

Data storage device 220 includes one or more devices capable of receiving, storing, generating, determining, and/or providing data associated with a vehicle search engine. For example, data storage device 220 may include a server device or a group of server devices. In some implementations, data storage device 220 may store images of vehicles that are accessible via the vehicle search engine, user interface interaction data for interactions that users have had with one or more interfaces of the vehicle search engine, user preferences data for one or more users, and/or the like. In some implementations, data storage device 220 may use an application programming interface (API) or another type of communication interface to provide stored data to vehicle search platform 230.

Vehicle search platform 230 includes one or more devices capable of receiving, storing, generating, determining, and/or providing information associated with a vehicle search engine. For example, vehicle search platform 230 may include a server device (e.g., a host server, a web server, an application server, etc.), a data center device, or a similar device. In some implementations, vehicle search platform 230 may host the vehicle search engine. In some implementations, vehicle search platform 230 may support the vehicle search engine. For example, the vehicle search engine may be hosted on vehicle search engine server 250 and vehicle search platform 230 may interact with vehicle search engine server 250 to provide recommendations of optimal vehicles and/or preferred vehicles to recommend to users.

In some implementations, as shown, vehicle search platform 230 may be hosted in cloud computing environment 240. While implementations described herein describe vehicle search platform 230 as being hosted in cloud computing environment 240, in some implementations, vehicle search platform 230 might not be cloud-based (i.e., may be implemented outside of a cloud computing environment) or may be partially cloud-based.

Cloud computing environment 240 includes an environment that hosts vehicle search platform 230. Cloud computing environment 240 may provide computation, software, data access, storage, etc. services that do not require end-user knowledge of a physical location and configuration of system(s) and/or device(s) that hosts vehicle search platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host vehicle search platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210, data storage device 220, and/or vehicle search engine server 250. Application 235-1 may eliminate a need to install and execute the software applications on these devices. For example, application 235-1 may include software associated with vehicle search platform 230 and/or any other software capable of being provided via cloud computing environment 240. In some implementations, one application 235-1 may send/receive information to/from one or more other applications 235-1, via virtual machine 235-2. In some implementations, application 235-1 may include the vehicle search application. Additionally, or alternatively, application 235-1 may include the model generation tool.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, data storage device 220, and/or vehicle search engine server 250), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Vehicle search engine server 250 includes one or more devices capable of receiving, storing, generating, determining, and/or providing information associated with a vehicle search engine. For example, vehicle search engine server 250 may include a server device or a group of server devices. In some implementations, vehicle search engine server 250 may host and/or support the vehicle search engine. In some implementations, vehicle search engine server 250 may perform one or more vehicle search services that are described as being performed by vehicle search platform 230.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
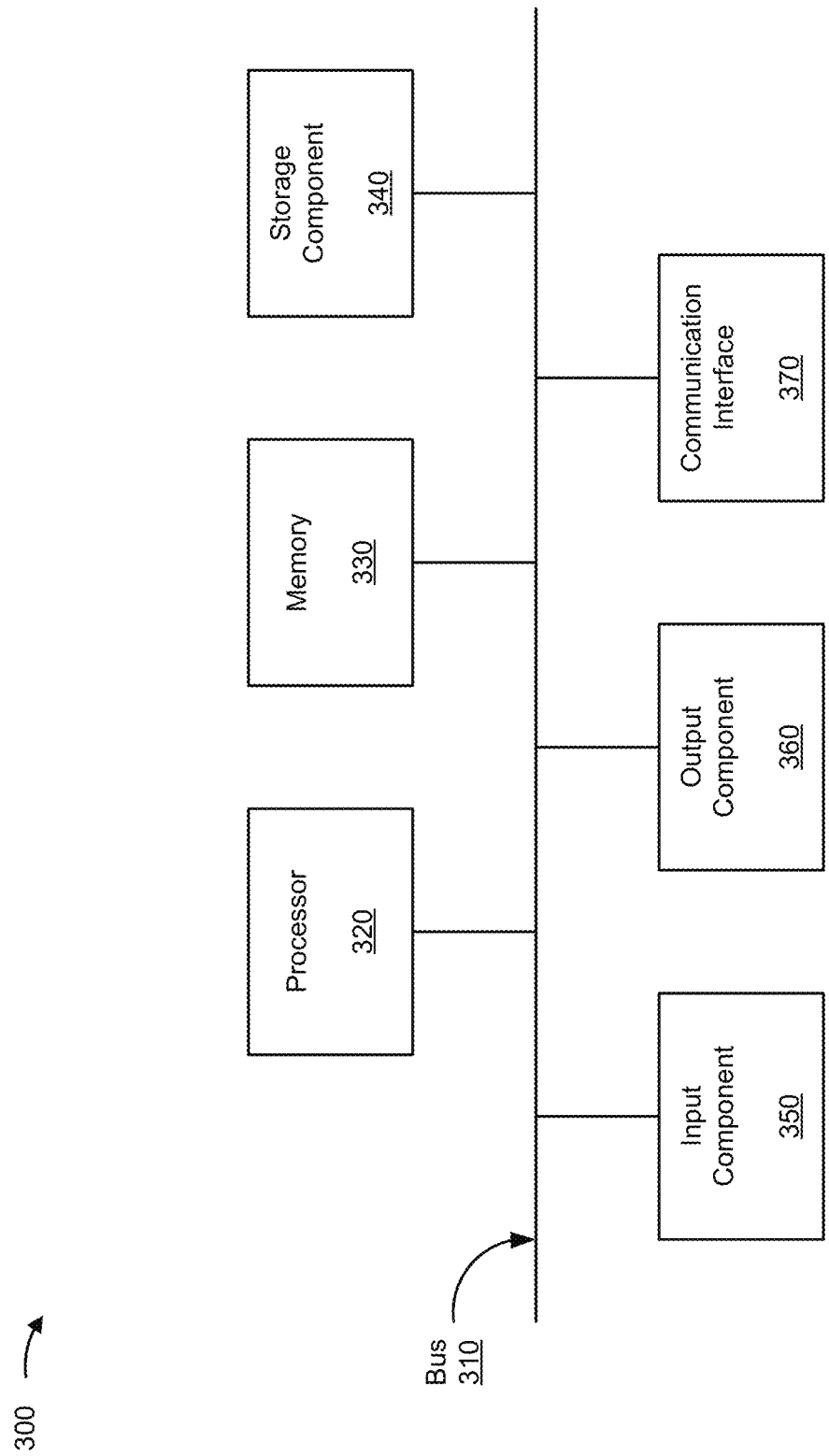
FIG. 3 is a diagram of example components of one or more devices of FIG. 2.

FIG. 3 is a diagram of example components of a device 300. Device 300 may correspond to user device 210, data storage device 220, vehicle search platform 230, and/or vehicle search engine server 250. In some implementations, user device 210, data storage device 220, vehicle search platform 230, and/or vehicle search engine server 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
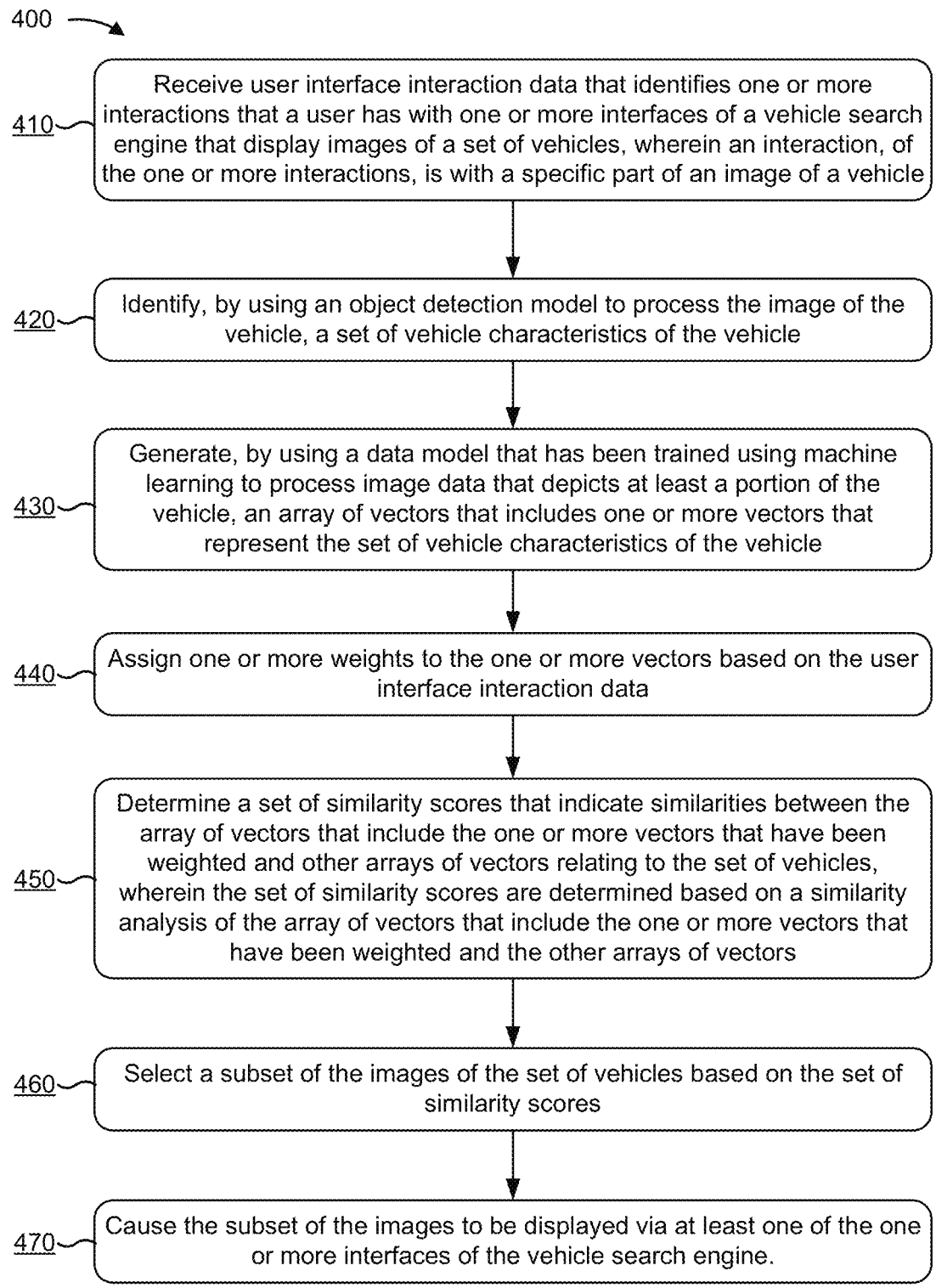
FIGS. 4-6 are flowcharts of one or more example processes for using machine learning to identify images of vehicles to display on an interface of a vehicle search engine.

FIG. 4 is a flow chart of an example process 400 for using machine learning to identify images of vehicles to display on an interface of a vehicle search engine. In some implementations, one or more process blocks of FIG. 4 may be performed by a vehicle search platform (e.g., vehicle search platform 230). In some implementations, one or more process blocks of FIG. 4 may be performed by another device or a group of devices separate from or including the vehicle search platform, such as a user device (e.g., user device 210), a data storage device (e.g., data storage device 220), a vehicle search engine server (e.g., vehicle search engine server 250), and/or the like.

As shown in FIG. 4, process 400 may include receiving user interface interaction data that identifies one or more interactions that a user has with one or more interfaces of a vehicle search engine that display images of a set of vehicles, wherein an interaction, of the one or more interactions, is with a specific part of an image of a vehicle (block 410). For example, the vehicle search platform (e.g., using computing resource 235, processor 320, memory 330, storage component 340, input component 350, communication interface 370, and/or the like) may receive user interface interaction data that identifies one or more interactions that a user has with one or more interfaces of a vehicle search engine that display images of a set of vehicles, as described above. In some implementations, an interaction, of the one or more interactions, may be with a specific part of an image of a vehicle.

As further shown in FIG. 4, process 400 may include identifying, by using an object detection model to process the image of the vehicle, a set of vehicle characteristics of the vehicle (block 420). For example, the vehicle search platform (e.g., using computing resource 235, processor 320, memory 330, storage component 340, and/or the like) may identify, by using an object detection model to process the image of the vehicle, a set of vehicle characteristics of the vehicle, as described above.

As further shown in FIG. 4, process 400 may include generating, by using a data model that has been trained using machine learning to process image data that depicts at least a portion of the vehicle, an array of vectors that includes one or more vectors that represent the set of vehicle characteristics of the vehicle (block 430). For example, the vehicle search platform (e.g., using computing resource 235, processor 320, memory 330, storage component 340, and/or the like) may generate, by using a data model that has been trained using machine learning to process image data that depicts at least a portion of the vehicle, an array of vectors that includes one or more vectors that represent the set of vehicle characteristics of the vehicle, as described above.

As further shown in FIG. 4, process 400 may include assigning one or more weights to the one or more vectors based on the user interface interaction data (block 440). For example, the vehicle search platform (e.g., using computing resource 235, processor 320, memory 330, storage component 340, and/or the like) may assign one or more weights to the one or more vectors based on the user interface interaction data, as described above.

As further shown in FIG. 4, process 400 may include determining, by the device, a set of similarity scores that indicate similarities between the array of vectors that include the one or more vectors that have been weighted and other arrays of vectors relating to the set of vehicles, wherein the set of similarity scores are determined based on a similarity analysis of the array of vectors that include the one or more vectors that have been weighted and the other arrays of vectors (block 450). For example, the vehicle search platform (e.g., using computing resource 235, processor 320, memory 330, storage component 340, and/or the like) may determine a set of similarity scores that indicate similarities between vectors that are part of the array of vectors and one or more other vectors that are part of other arrays of vectors relating to the set of vehicles, as described above. In some implementations, the set of similarity scores may be determined based on a similarity analysis of the vectors and the one or more other vectors.

As further shown in FIG. 4, process 400 may include selecting a subset of the images of the set of vehicles based on the set of similarity scores (block 460). For example, the vehicle search platform (e.g., using computing resource 235, processor 320, memory 330, storage component 340, and/or the like) may select a subset of the images of the set of vehicles based on the set of similarity scores, as described above.

As further shown in FIG. 4, process 400 may include causing the subset of the images to be displayed via at least one of the one or more interfaces of the vehicle search engine (block 470). For example, the vehicle search platform (e.g., using computing resource 235, processor 320, memory 330, storage component 340, output component 360, communication interface 370, and/or the like) may cause the subset of the images to be displayed via at least one of the one or more interfaces of the vehicle search engine, as described above.

Process 400 may include additional implementations, such as any single implementation or any combination of implementations described below and/or in connection with one or more other processes described elsewhere herein.

In some implementations, the one or more interactions identified by the user interface interaction data may be a sequence of interactions that the user has with the one or more interfaces over a given time period. In some implementations, when assigning the one or more weights of vectors, the vehicle search platform may assign the one or more weights to the one or more vectors based on the sequence of interactions.

In some implementations, the vehicle search platform may identify an orientation of the vehicle within the image. In some implementations, the vehicle search platform may filter the other arrays of vectors based on the orientation of the vehicle within the image. In some implementations, when determining the set of similarity scores, the vehicle search platform may determine the set of similarity scores that indicate a level of similarity between the array of vectors that include the one or more vectors that have been weighted and the other arrays of vectors that have been filtered.

In some implementations, the set of vehicle characteristics may include a first subset of vehicle characteristics that are of a first level of granularity and one or more other subsets of vehicle characteristics that are of one or more other levels of granularity. In some implementations, the vehicle search platform may filter, based on the first subset of vehicle characteristics that are of the first level of granularity, a master set of vehicle characteristics to identify a filtered master set of vehicle characteristics. In some implementations, when determining the set of similarity scores, the vehicle search platform may determine the set of similarity scores by performing the similarity analysis on the array of vectors that include the one or more vectors that have been weighted and a particular set of vectors that correspond to the filtered master set of vehicle characteristics.

In some implementations, the set of vehicle characteristics may include at least one of: a trim of the vehicle, a style of the vehicle, a shade of a color of the vehicle, a subcomponent of a component of the vehicle, an attribute of the component of the vehicle, or an attribute of the sub-component of the component.

In some implementations, the one or more interactions identified by the user interface interaction data may be a sequence of interactions that the user has with the one or more interfaces over a given time period. In some implementations, the vehicle search platform may generate user preferences data that identifies one or more user preferences of the user based on the sequence of interactions that the user has with the one or more interfaces. In some implementations, when assigning the one or more weights, the vehicle search platform may assign the one or more weights to the one or more vectors based on the user interface interaction data and the user preferences data.

In some implementations, the set of vehicle characteristics may be a first set of vehicle characteristics that are detectable by the object detection model. In some implementations, the vehicle search platform may identify a second set of vehicle characteristics that are not detectable by the object detection model and may filter the arrays of vectors relating to the set of vehicles based on the second set of vehicle characteristics. Consequently, when determining the set of similarity scores, the vehicle search platform may determine the set of similarity scores between the array of vectors that include the one or more vectors that have been weighted and a filtered set of vectors that are part of the other arrays of vectors relating to the set of vehicles.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
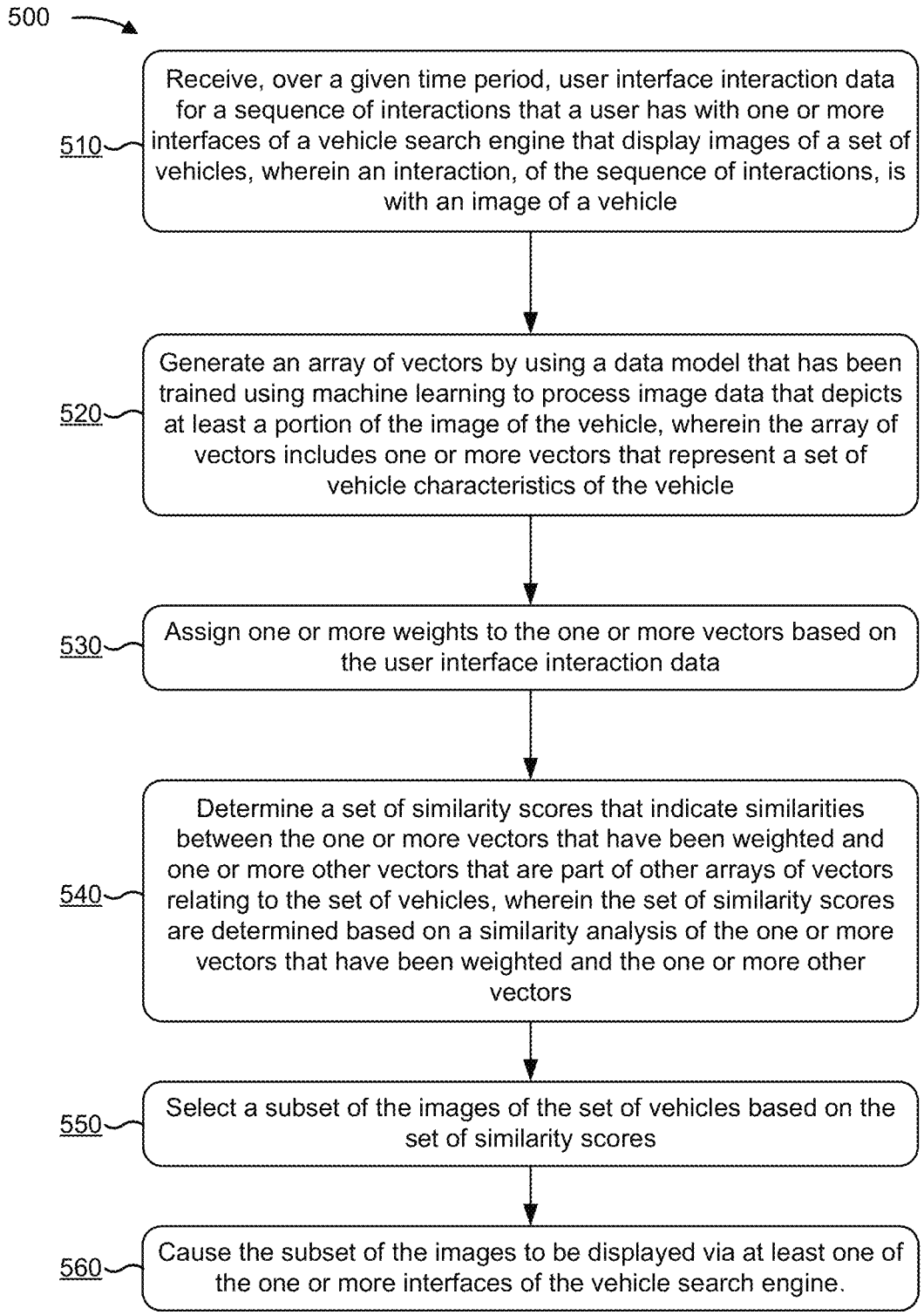

FIG. 5 is a flow chart of an example process 500 for using machine learning to identify images of vehicles to display on an interface of a vehicle search engine. In some implementations, one or more process blocks of FIG. 5 may be performed by a vehicle search platform (e.g., vehicle search platform 230). In some implementations, one or more process blocks of FIG. 5 may be performed by another device or a group of devices separate from or including the vehicle search platform, such as a user device (e.g., user device 210), a data storage device (e.g., data storage device 220), a vehicle search engine server (e.g., vehicle search engine server 250), and/or the like.

As shown in FIG. 5, process 500 may include receiving, over a given time period, user interface interaction data for a sequence of interactions that a user has with one or more interfaces of a vehicle search engine that display images of a set of vehicles, wherein an interaction, of the sequence of interactions, is with an image of a vehicle (block 510). For example, the vehicle search platform (e.g., using computing resource 235, processor 320, memory 330, storage component 340, input component 350, communication interface 370, and/or the like) may receive, over a given time period, user interface interaction data for a sequence of interactions that a user has with one or more interfaces of a vehicle search engine that display images of a set of vehicles, as described above. In some implementations, an interaction, of the sequence of interactions, may be with an image of a vehicle.

As further shown in FIG. 5, process 500 may include generating an array of vectors by using a data model that has been trained using machine learning to process image data that depicts at least a portion of the image of the vehicle, wherein the array of vectors includes one or more vectors that represent a set of vehicle characteristics of the vehicle (block 520). For example, the vehicle search platform (e.g., using computing resource 235, processor 320, memory 330, storage component 340, and/or the like) may generate an array of vectors by using a data model that has been trained using machine learning to process the image of the vehicle and the user interface interaction data, as described above. In some implementations, the array of vectors may include one or more vectors that represent a set of vehicle characteristics of the vehicle.

As further shown in FIG. 5, process 500 may include assigning one or more weights to the one or more vectors based on the user interface interaction data (block 530). For example, the vehicle search platform (e.g., using computing resource 235, processor 320, memory 330, storage component 340, and/or the like) may assign one or more weights to the one or more vectors based on the user interface interaction data, as described above.

As further shown in FIG. 5, process 500 may include determining a set of similarity scores that indicate similarities between the one or more vectors that have been weighted and one or more other vectors that are part of other arrays of vectors relating to the set of vehicles, wherein the set of similarity scores are determined based on a similarity analysis of the one or more vectors that have been weighted and the one or more other vectors (block 540). For example, the vehicle search platform (e.g., using computing resource 235, processor 320, memory 330, storage component 340, and/or the like) may determine a set of similarity scores that indicate similarities between the one or more vectors that have been weighted and one or more other vectors that are part of other arrays of vectors relating to the set of vehicles, as described above. In some implementations, the set of similarity scores may be determined based on a similarity analysis of the one or more vectors that have been weighted and the one or more other vectors.

As further shown in FIG. 5, process 500 may include selecting a subset of the images of the set of vehicles based on the set of similarity scores (block 550). For example, the vehicle search platform (e.g., using computing resource 235, processor 320, memory 330, storage component 340, and/or the like) may select a subset of the images of the set of vehicles based on the set of similarity scores, as described above.

As further shown in FIG. 5, process 500 may include causing the subset of the images to be displayed via at least one of the one or more interfaces of the vehicle search engine (block 560). For example, the vehicle search platform (e.g., using computing resource 235, processor 320, memory 330, storage component 340, output component 360, communication interface 370, and/or the like) may cause the subset of the images to be displayed via at least one of the one or more interfaces of the vehicle search engine, as described above.

Process 500 may include additional implementations, such as any single implementation or any combination of implementations described below and/or in connection with one or more other processes described elsewhere herein.

In some implementations, the vehicle search platform may identify, before generating the array of vectors, the set of vehicle characteristics of the vehicle by using an object detection model to process the image of the vehicle. In some implementations, the interaction with the image of the vehicle may be a particular interaction with a specific part of the image of vehicle. Consequently, when assigning the one or more weights to the one or more vectors, the vehicle search platform may assign the one or more weights based on the sequence of interactions and based on the particular interaction with the specific part of the image of the vehicle.

In some implementations, the vehicle search platform may identify an orientation of the vehicle within the image. In some implementations, the vehicle search platform may filter the other arrays of vectors that correspond to particular vehicle characteristics, of the set of vehicle characteristics, to identify a filtered set of vectors that correspond to a subset of the particular vehicle characteristics that are depicted in particular images, of the images of the set of vehicles, that share a same orientation or a similar orientation as the orientation of the vehicle within the image. In some implementations, the vehicle search platform may determine the set of similarity scores that indicate a level of similarity between the array of vectors that include the one or more vectors that have been weighted and particular vectors that are part of the filtered set of vectors.

In some implementations, the set of vehicle characteristics may include a first subset of vehicle characteristics that are of a first level of granularity. In some implementations, the vehicle search platform may filter, based on the first subset of vehicle characteristics that are of the first level of granularity, a master set of vehicle characteristics to identify a filtered master set of vehicle characteristics. In some implementations, the vehicle search platform may determine the set of similarity scores by performing the similarity analysis on the array of vectors that include the one or more vectors that have been weighted and one or more particular arrays of vectors that correspond to the filtered master set of vehicle characteristics.

In some implementations, the set of vehicle characteristics may include at least one of: a trim of the vehicle, a style of the vehicle, a shade of a color of the vehicle, a sub-component of the component of the vehicle, an attribute of the component of the vehicle, or an attribute of the sub-component of the component.

In some implementations, the vehicle search platform may identify an error in a vehicle description that is used in the vehicle search engine by using one or more anomaly detection techniques to process image metadata associated with the images of the set of vehicles. In some implementations, the vehicle search platform may cause the vehicle description to be corrected. In some implementations, the vehicle search platform may retrain the data model with a corrected vehicle description.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
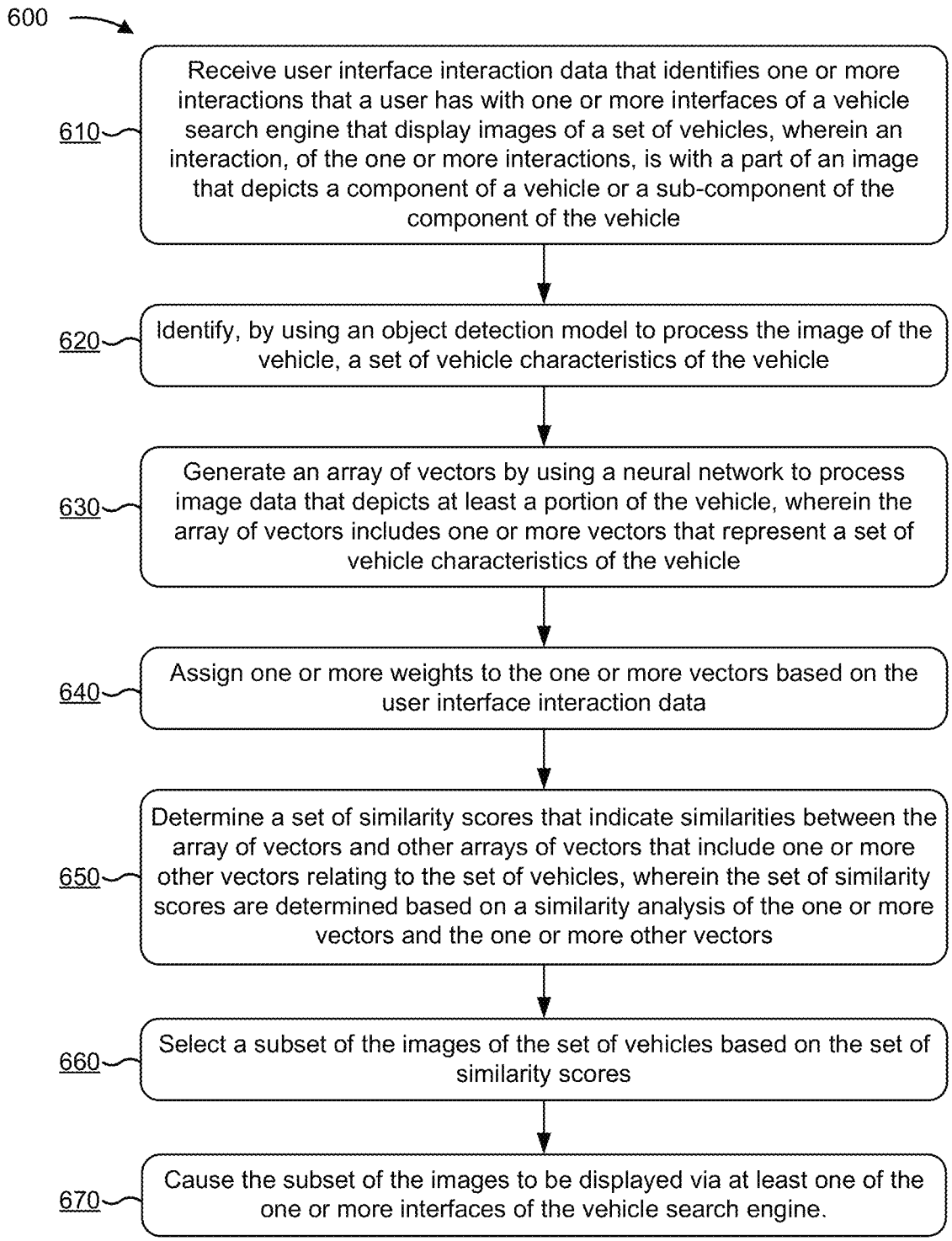

FIG. 6 is a flow chart of an example process 600 for using machine learning to identify images of vehicles to display on an interface of a vehicle search engine. In some implementations, one or more process blocks of FIG. 6 may be performed by a vehicle search platform (e.g., vehicle search platform 230). In some implementations, one or more process blocks of FIG. 6 may be performed by another device or a group of devices separate from or including the vehicle search platform, such as a user device (e.g., user device 210), a data storage device (e.g., data storage device 220), a vehicle search engine server (e.g., vehicle search engine server 250), and/or the like.

As shown in FIG. 6, process 600 may include receiving user interface interaction data that identifies one or more interactions that a user has with one or more interfaces of a vehicle search engine that display images of a set of vehicles, wherein an interaction, of the one or more interactions, is with a part of an image that depicts a component of a vehicle or a sub-component of the component of the vehicle (block 610). For example, the vehicle search platform (e.g., using computing resource 235, processor 320, memory 330, storage component 340, input component 350, communication interface 370, and/or the like) may receive user interface interaction data that identifies one or more interactions that a user has with one or more interfaces of a vehicle search engine that display images of a set of vehicles, as described above. In some implementations, an interaction, of the one or more interactions, may be with a part of an image that depicts a component of a vehicle or a sub-component of the component of the vehicle.

As further shown in FIG. 6, process 600 may include identify, by using an object detection model to process the image of the vehicle, a set of vehicle characteristics of the vehicle (block 620). For example, the vehicle search platform (e.g., using computing resource 235, processor 320, memory 330, storage component 340, and/or the like) may identify, by using an object detection model to process the image of the vehicle, a set of vehicle characteristics of the vehicle, as described above.

As further shown in FIG. 6, process 600 may include generating an array of vectors by using a neural network to process image data that depicts at least a portion of the vehicle, wherein the array of vectors includes one or more vectors that represent a set of vehicle characteristics of the vehicle (block 630). For example, the vehicle search platform (e.g., using computing resource 235, processor 320, memory 330, storage component 340, and/or the like) may generate an array of vectors by using a neural network to process image data that depicts at least a portion of the vehicle, as described above. In some implementations, the array of vectors may include one or more vectors that represent a set of vehicle characteristics of the vehicle.

As further shown in FIG. 6, process 600 may include assigning one or more weights to the one or more vectors based on the user interface interaction data (block 640). For example, the vehicle search platform (e.g., using computing resource 235, processor 320, memory 330, storage component 340, and/or the like) may assign one or more weights to the one or more vectors based on the user interface interaction data, as described above.

As further shown in FIG. 6, process 600 may include determining a set of similarity scores that indicate similarities between the array of vectors and other arrays of vectors that include one or more other vectors relating to the set of vehicles, wherein the set of similarity scores are determined based on a similarity analysis of the one or more vectors and the one or more other vectors (block 650). For example, the vehicle search platform (e.g., using computing resource 235, processor 320, memory 330, storage component 340, and/or the like) may determine a set of similarity scores that indicate similarities between the array of vectors and other arrays of vectors that include one or more other vectors relating to the set of vehicles, as described above. In some implementations, the set of similarity scores may be determined based on a similarity analysis of the one or more vectors and the one or more other vectors.

As further shown in FIG. 6, process 600 may include selecting a subset of the images of the set of vehicles based on the set of similarity scores (block 660). For example, the vehicle search platform (e.g., using computing resource 235, processor 320, memory 330, storage component 340, and/or the like) may select a subset of the images of the set of vehicles based on the set of similarity scores, as described above.

As further shown in FIG. 6, process 600 may include causing the subset of the images to be displayed via at least one of the one or more interfaces of the vehicle search engine (block 670). For example, the vehicle search platform (e.g., using computing resource 235, processor 320, memory 330, storage component 340, and/or the like) may cause the subset of the images to be displayed via at least one of the one or more interfaces of the vehicle search engine, as described above.

Process 600 may include additional implementations, such as any single implementation or any combination of implementations described below and/or in connection with one or more other processes described elsewhere herein.

In some implementations, the one or more interactions identified by the user interface interaction data may be a sequence of interactions that the user has with the one or more interfaces over a given time period. In some implementations, when assigning the weights to the one or more vectors, the vehicle search platform may assign the weights based on the sequence of interactions.

In some implementations, the vehicle search platform may identify an orientation of the vehicle within the image. In some implementations, the vehicle search platform may filter the other arrays of vectors based on the orientation of the vehicle within the image. In some implementations, when determining the set of similarity scores, the vehicle search platform may determine the set of similarity scores that indicate a level of similarity between the array of vectors that include the one or more vectors that have been weighted and one or more particular arrays of vectors of the other arrays of vectors that have been filtered.

In some implementations, the set of vehicle characteristics may include a first subset vehicle characteristics that are of a first level of granularity and one or more other subsets of vehicle characteristics that are of one or more other levels of granularity. In some implementations, the vehicle search platform may filter, based on the first subset of vehicle characteristics that are of the first level of granularity, a master set of vehicle characteristics to identify a filtered master set of vehicle characteristics. In some implementations, when determining the set of similarity scores, the vehicle search platform may determine the set of similarity scores by performing the similarity analysis on the array of vectors that include the one or more vectors that have been weighted and particular arrays of vectors that correspond to the filtered master set of vehicle characteristics.

In some implementations, wherein the set of vehicle characteristics are a first set of vehicle characteristics that are detectable by the object detection model. In some implementations, when generating the array of vectors, the vehicle search platform may identify a second set of vehicle characteristics that are not detectable by the object detection model and may filter the other arrays of vectors relating to the set of vehicles based on the second set of vehicle characteristics. In some implementations, when determining the set of similarity scores, the vehicle search platform may determine the set of similarity scores between the array of vectors that include the one or more vectors that have been weighted and a filtered set of vectors that are part of the other arrays of vectors relating to the set of vehicles.

In some implementations, the vehicle search platform may identify user preferences data that identifies one or more user preferences of the user based on the user interface interaction data that has been received. In some implementations, when assigning the one or more weights, the vehicle search platform may assign the one or more weights to the one or more vectors based on the user interface interaction data and the user preferences data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, coupled to the one or more memories, configured to:
identify, based on at least one model that processes an image of an object, a set of characteristics of the object,
wherein the at least one model outputs one or more image crops that include labeled characteristics of the object;
generate, based on the at least one model that has been trained with the one or more image crops, a first set of arrays of vectors that represent the set of characteristics;
assign, based on user interface interaction data, a set of weights to the first set of arrays of vectors;
identify a first orientation of the object within the image;
generate, based on filtering a second set of arrays of vectors associated with a set of objects that includes the object, a subset of arrays of vectors,
wherein the subset of arrays of vectors are associated with a second orientation of the object in a set of images of the set of objects;
determine a set of similarity scores that indicate similarities between the first set of arrays of vectors and the subset of arrays of vectors; and
select, based on the set of similarity scores, a subset of the set of images of the set of objects to be displayed.

2. The device of claim 1, wherein the labeled characteristics of the object include predicted object characteristics, predicted by the at least one model to be present in the image.

3. The device of claim 1, wherein the one or more processors, to identify the set of characteristics of the object, are configured to:
determine a first set of characteristics using an object detection model,
wherein the first set of characteristics are used to train the at least one model; and
determine a second set of characteristics using one or more computer vision techniques,
wherein the second set of characteristics includes particular characteristics that are not detectable by the object detection model, and
wherein the second set of characteristics are used to filter search results of an image search engine.

4. The device of claim 1, wherein the user interface interaction data identifies at least one of:
one or more search parameters,
a time associated with the one or more search parameters,
a particular part of the image,
a time associated with an interaction with the image, or
a sequence of interactions with a user interface over a time period.

5. The device of claim 1, wherein the one or more processors, to assign the set of weights to the first set of arrays of vectors, are configured to:
assign higher weights to a particular vector, of the first set of arrays of vectors, that is associated with a particular characteristic, of the set of characteristics, that a user is interacting with.

6. The device of claim 1, wherein the one or more processors are further configured to:
receive user preference data of one or more users that have previously accessed an image search engine,
wherein the user preference data is used for assigning the set of weights to the first set of arrays of vectors.

7. The device of claim 1, wherein the one or more processors, to select the subset of the set of images of the set of objects to be displayed, are configured to:
determine that one or more scores, of the set of similarity scores, satisfy a threshold; and
select the subset that maps to particular arrays of vectors, of the subset of arrays of vectors, that have similarity scores that satisfy the threshold.

8. A method, comprising:
identifying, by a device and based on at least one model that processes an image of an object, a set of characteristics of the object,
wherein the at least one model outputs one or more image crops that include labeled characteristics of the object;
generating, by the device and based on the at least one model that has been trained with the one or more image crops, a first set of arrays of vectors that represent the set of characteristics;
assigning, by the device and based on user interface interaction data, a set of weights to the first set of arrays of vectors;
identifying, by the device, a first orientation of the object within the image;
generating, by the device and based on filtering a second set of arrays of vectors associated with a set of objects that includes the object, a subset of arrays of vectors,
wherein the subset of arrays of vectors are associated with a second orientation of the object in a set of images of the set of objects;
determining, by the device, a set of similarity scores that indicate similarities between the first set of arrays of vectors and the subset of arrays of vectors; and
selecting, by the device and based on the set of similarity scores, a subset of the set of images of the set of objects to be displayed.

9. The method of claim 8, wherein the labeled characteristics of the object include predicted object characteristics, predicted by the at least one model to be present in the image.

10. The method of claim 8, wherein identifying the set of characteristics of the object comprises:
determining a first set of characteristics using an object detection model,
wherein the first set of characteristics are used to train the at least one model; and determining a second set of characteristics using one or more computer vision techniques,
wherein the second set of characteristics includes particular characteristics that are not detectable by the object detection model, and
wherein the second set of characteristics are used to filter search results of an image search engine.

11. The method of claim 8, wherein the user interface interaction data identifies at least one of:
one or more search parameters,
a time associated with the one or more search parameters,
a particular part of the image,
a time associated with an interaction with the image, or
a sequence of interactions with a user interface over a time period.

12. The method of claim 8, wherein assigning the set of weights to the first set of arrays of vectors comprises:
assigning higher weights to a particular vector, of the first set of arrays of vectors, that is associated with a particular characteristic, of the set of characteristics, that a user is interacting with.

13. The method of claim 8, further comprising:
receiving user preference data of one or more users that have previously accessed an image search engine,
wherein the user preference data is used for assigning the set of weights to the first set of arrays of vectors.

14. The method of claim 8, wherein selecting the subset of the set of images of the set of objects to be displayed comprises:
determining that one or more scores, of the set of similarity scores, satisfy a threshold; and
selecting the subset that maps to particular arrays of vectors, of the subset of arrays of vectors, that have similarity scores that satisfy the threshold.

15. A non-transitory computer-readable medium storing a set of instructions, the set of instructions comprising:
one or more instructions that, when executed by one or more processors of a device, cause the device to:
identify, based on at least one model that processes an image of an object, a set of characteristics of the object,
wherein the at least one model outputs one or more image crops that include labeled characteristics of the object;
generate, based on the at least one model that has been trained with the one or more image crops, a first set of arrays of vectors that represent the set of characteristics;
assign, based on user interface interaction data, a set of weights to the first set of arrays of vectors;
identify a first orientation of the object within the image;
generate, based on filtering a second set of arrays of vectors associated with a set of objects that includes the object, a subset of arrays of vectors,
wherein the subset of arrays of vectors are associated with a second orientation of the object in a set of images of the set of objects;
determine a set of similarity scores that indicate similarities between the first set of arrays of vectors and the subset of arrays of vectors; and
select, based on the set of similarity scores, a subset of the set of images of the set of objects to be displayed.

16. The non-transitory computer-readable medium of claim 15, wherein the labeled characteristics of the object include predicted object characteristics, predicted by the at least one model to be present in the image.

17. The non-transitory computer-readable medium of claim 15, wherein the one or more instructions, that cause the device to identify the set of characteristics of the object, cause the device to:
determine a first set of characteristics using an object detection model,
wherein the first set of characteristics are used to train the at least one model; and
determine a second set of characteristics using one or more computer vision techniques,
wherein the second set of characteristics includes particular characteristics that are not detectable by the object detection model, and
wherein the second set of characteristics are used to filter search results of an image search engine.

18. The non-transitory computer-readable medium of claim 15, wherein the user interface interaction data identifies at least one of:
one or more search parameters,
a time associated with the one or more search parameters,
a particular part of the image,
a time associated with an interaction with the image, or
a sequence of interactions with a user interface over a time period.

19. The non-transitory computer-readable medium of claim 15, wherein the one or more instructions, that cause the device to assign the set of weights to the first set of arrays of vectors, cause the device to:
assign higher weights to a particular vector, of the first set of arrays of vectors, that is associated with a particular characteristic, of the set of characteristics, that a user is interacting with.

20. The non-transitory computer-readable medium of claim 15, wherein the one or more instructions further cause the device to:
receive user preference data of one or more users that have previously accessed an image search engine,
wherein the user preference data is used for assigning the set of weights to the first set of arrays of vectors.

* * * * *